United States Patent [19]

Iijima

[11] Patent Number: 5,097,118

[45] Date of Patent: Mar. 17, 1992

[54] PORTABLE ELECTRONIC APPARATUS FOR WRITING AND READING DATA TO AND FROM AN EXTERNAL DEVICE AND PERFORMING DATA MEMORY ALLOCATION

[75] Inventor: Yasuo Iijima, Yokohama, Japan

[73] Assignee: Kabushiki Kaisha Toshiba, Kawasaki, Japan

[21] Appl. No.: 319,729

[22] Filed: Mar. 7, 1989

[30] Foreign Application Priority Data

Mar. 9, 1988 [JP] Japan .................................. 63-55376
Aug. 12, 1988 [JP] Japan ................................. 63-200017

[51] Int. Cl.⁵ ............................................. G06K 19/06
[52] U.S. Cl. ................................. 235/492; 364/282.3; 360/49; 365/230.01
[58] Field of Search ................. 235/492; 360/49, 72.1; 365/230.01; 364/200 MS File, 900 MS File, 282.3

[56] References Cited

U.S. PATENT DOCUMENTS

| | | |
|---|---|---|
| 3,829,837 | 8/1974 | Farr .................................. 360/49 X |
| 4,575,827 | 3/1986 | Kulakowski .................. 365/230.01 |
| 4,734,568 | 3/1988 | Watanabe . |
| 4,797,543 | 1/1989 | Watanabe ............................. 235/492 |

FOREIGN PATENT DOCUMENTS 0089876 9/1983 European Pat. Off. .
2212603 7/1974 France .
8707060 11/1987 World Int. Prop. O. .

*Primary Examiner*—David Trafton
*Attorney, Agent, or Firm*—Cushman, Darby & Cushman

[57] ABSTRACT

A memory section of an IC card is divided into a plurality of areas. Identification data is induvidually assigned to each area. The IC card has a first means for selecting a physically identical area based on at least two identification data. The IC card further has a second means for setting different access enable/disable conditions when an access is made by the first means based on the two identification data. The IC card further has a third means for setting the same access enable/disable condition. The IC card further has a fourth means for selecting whether the second or third means is used.

12 Claims, 31 Drawing Sheets

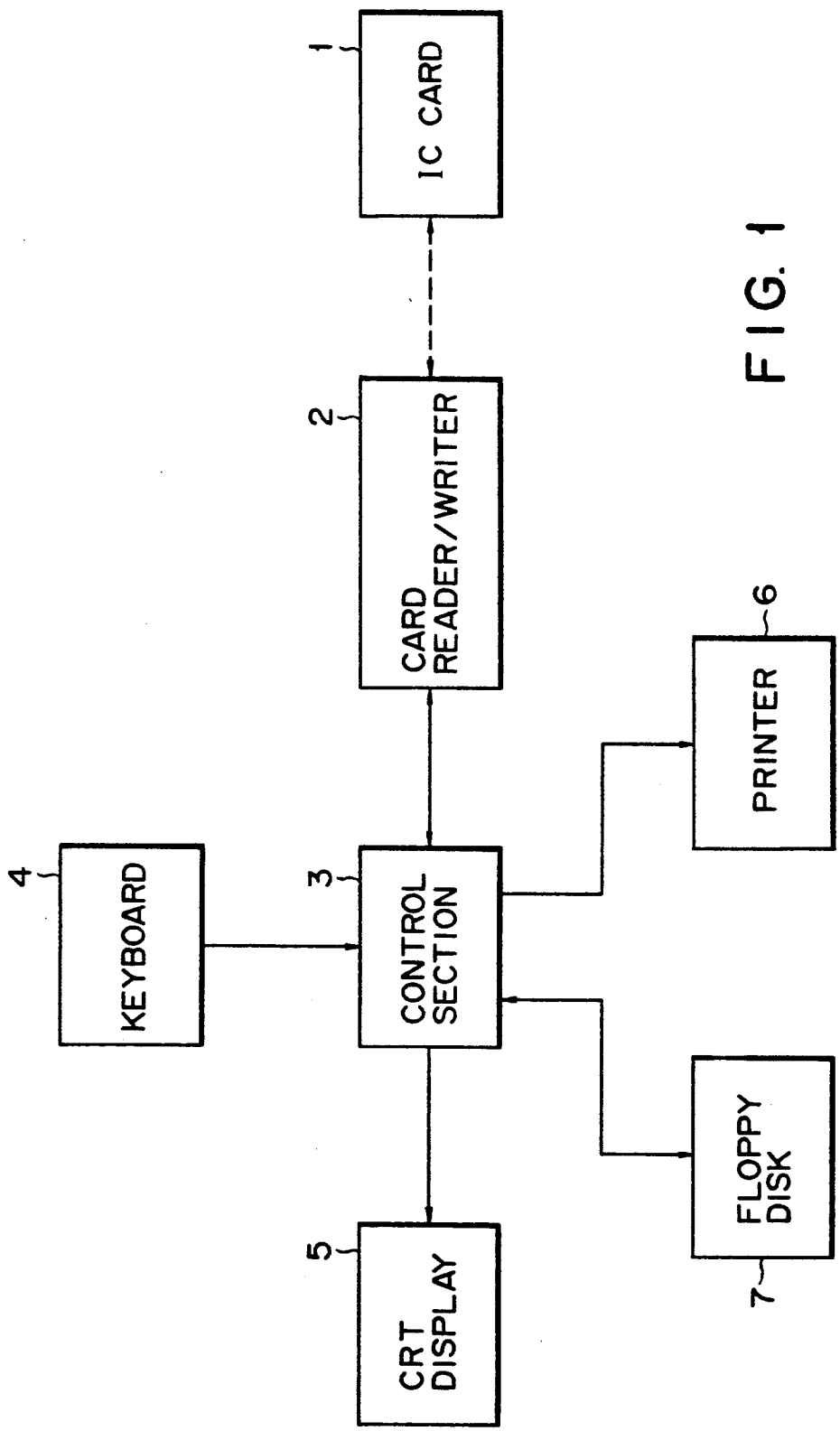

|    | 33 | 35 | 37  | 39  | 41 | 43 | |
|----|----|----|-----|-----|----|----|---|
|    | 00 | 08 | A01 | S01 | 00 | *  | * |
|    | 02 | 01 | A02 | S02 | 00 | *  | * |
|    | 01 | 01 | A03 | S03 | 00 | *  | * |
|    | 03 | 01 | A04 | S04 | 00 | *  | * |
|    | 01 | 03 | A05 | S05 | 00 | *  | * |

FIG. 6A

|    | 33 | 35 | 37  | 39  | 41 | 43 | |
|----|----|----|-----|-----|----|----|----|
|    | 00 | 08 | A01 | S01 | 00 | *  | *  |
|    | 02 | 01 | A02 | S02 | 00 | *  | *  |
|    | 01 | 01 | A03 | S03 | 00 | *  | *  |
|    | 03 | 01 | A04 | S04 | 00 | *  | *  |
|    | 01 | 03 | A05 | S05 | 00 | *  | *  |
|    | 02 | 02 | *   | *   | 01 | 01 | 01 |
|    | 03 | 02 | *   | *   | 01 | 01 | 03 |

FIG. 6B

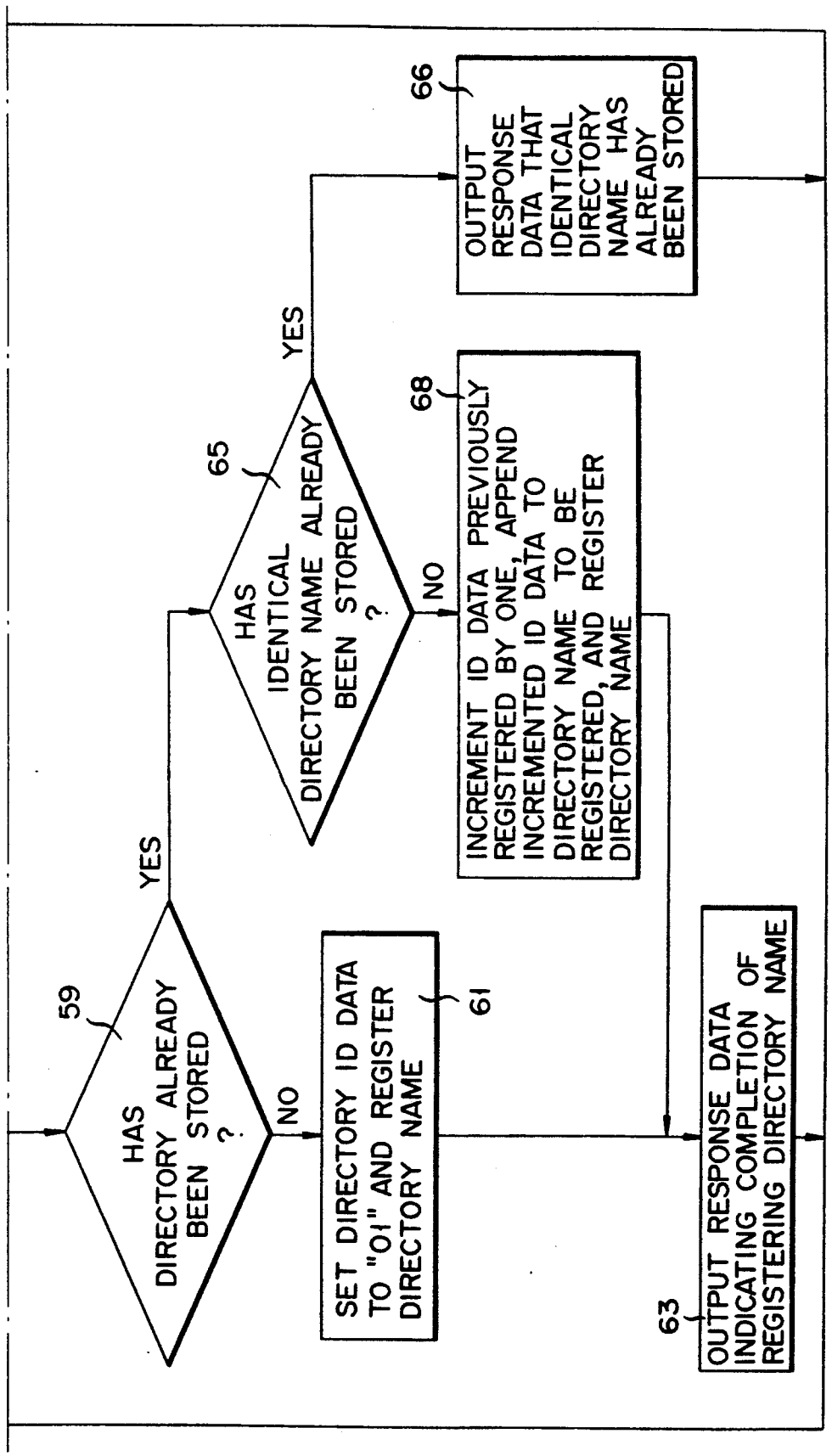
FIG. 9A-II

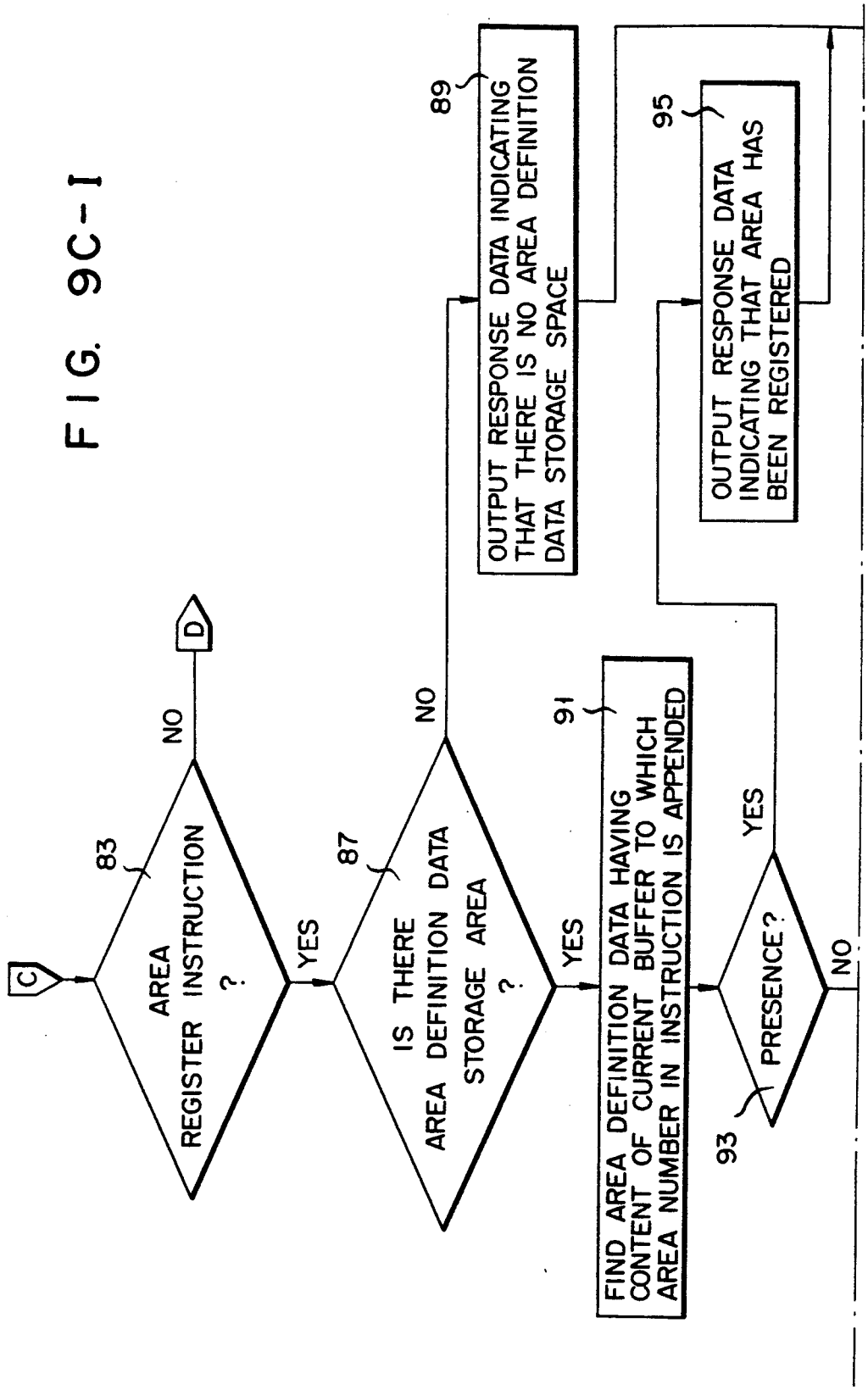

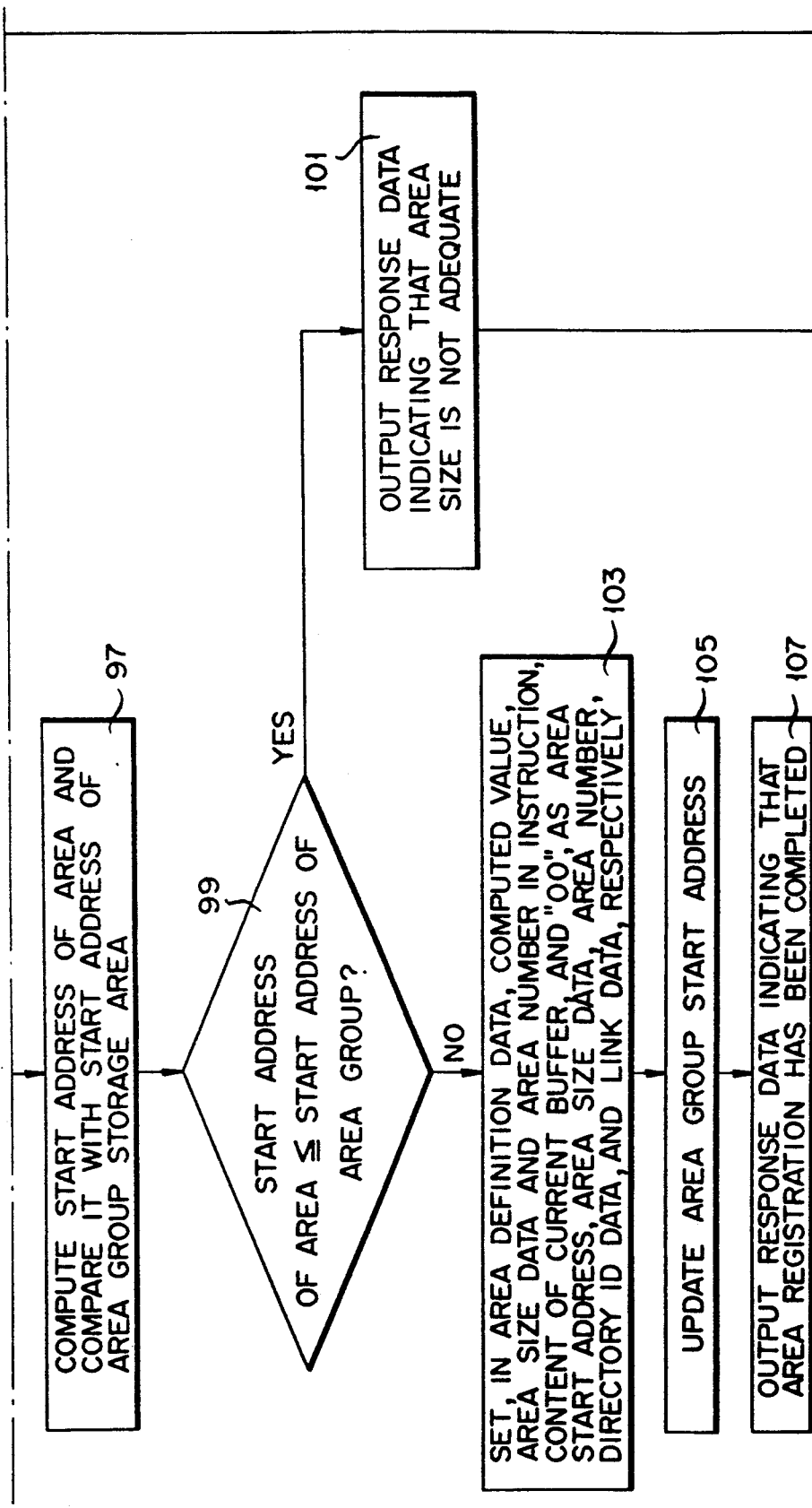
FIG. 9C-II

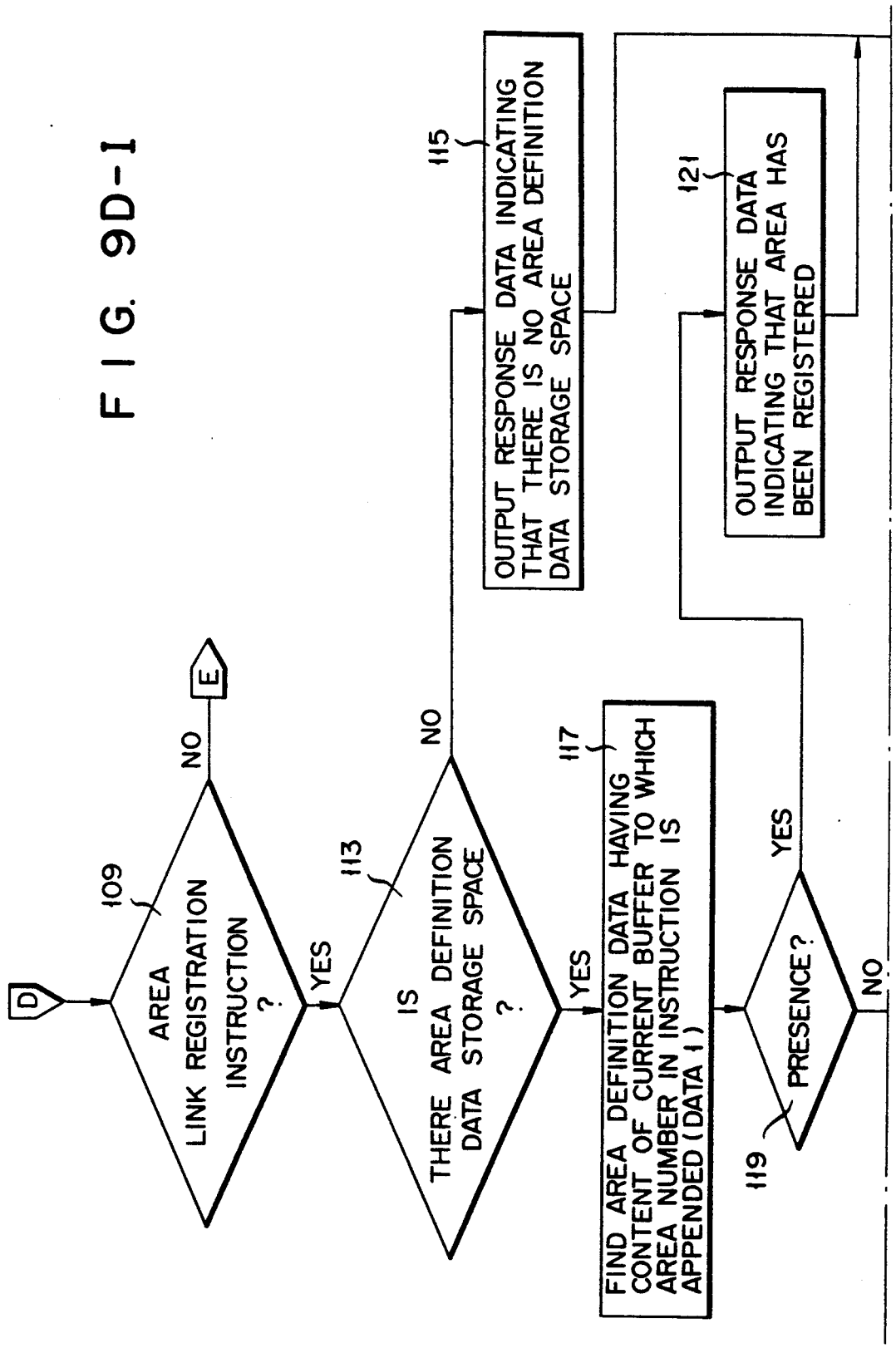

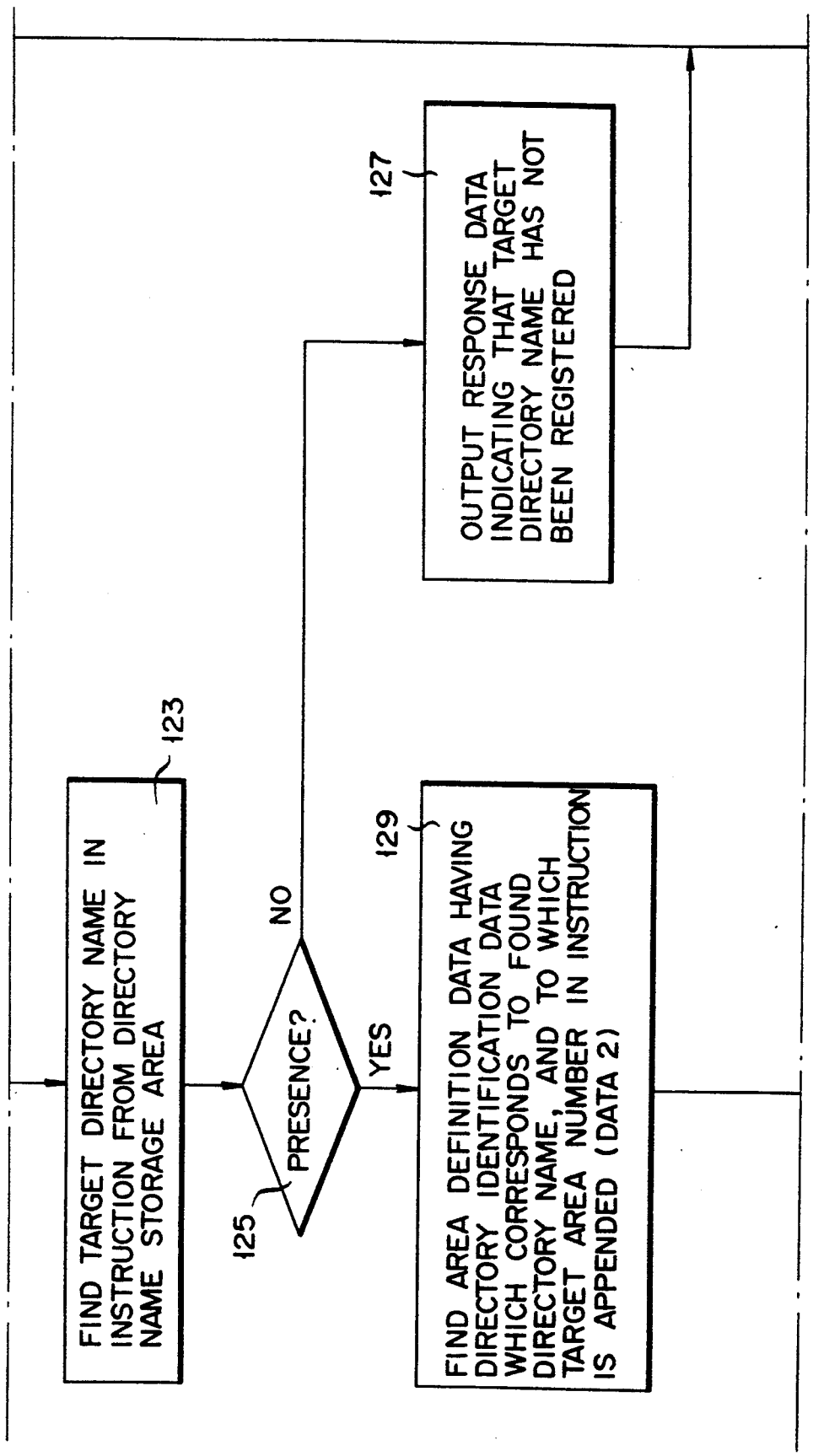
FIG. 9D-II

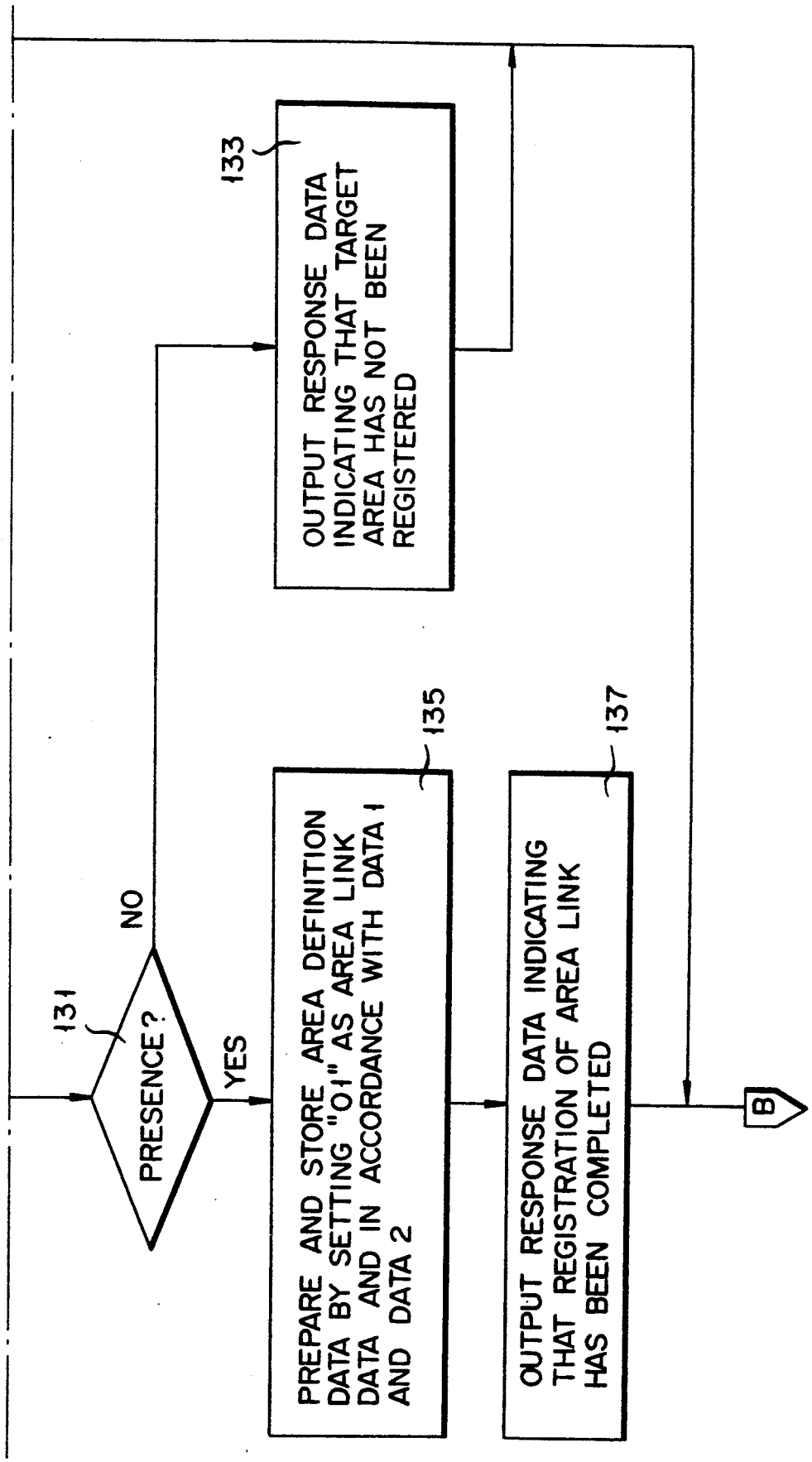
FIG. 9D-Ⅲ

| DIRECTORY NAME REGISTRATION FUNCTION CODE | DIRECTORY NAME |
|---|---|

52

F I G. 10

| DIRECTORY NAME SELECTION FUNCTION CODE | DIRECTORY NAME |
|---|---|

65

F I G. 11

| AREA REGISTRATION FUNCTION CODE | AREA NUMBER | AREA SIZE |
|---|---|---|

85

F I G. 12

| AREA-LINK REGISTRATION FUNCTION CODE | AREA NUMBER | DIRECTORY NAME TO BE LINKED | AREA NUMBER TO BE LINKED |
|---|---|---|---|

111

F I G. 13

| READ FUNCTION CODE | AREA NUMBER |
|---|---|

141

F I G. 14

| WRITE FUNCTION CODE | AREA NUMBER | WRITE DATA |
|---|---|---|

143

F I G. 15

|  33 |  35 |  37 |  39 |  41 | 43  |     | 185 | 187 |
|-----|-----|-----|-----|-----|-----|-----|-----|-----|
| 00  | 08  | A01 | S01 | 00  | *   | *   | 01  | X01 |
| 02  | 01  | A02 | S02 | 00  | *   | *   | 01  | X02 |
| 01  | 01  | A03 | S03 | 00  | *   | *   | 01  | X03 |
| 03  | 01  | A04 | S04 | 00  | *   | *   | 01  | X04 |
| 01  | 03  | A05 | S05 | 00  | *   | *   | 01  | X05 |

FIG. 18A

| 00 | 08 | A01 | S01 | 00 | *  | *  | 01 | X01 |
|----|----|-----|-----|----|----|----|----|-----|
| 02 | 01 | A02 | S02 | 00 | *  | *  | 01 | X02 |
| 01 | 01 | A03 | S03 | 00 | *  | *  | 01 | X03 |
| 03 | 01 | A04 | S04 | 00 | *  | *  | 01 | X04 |
| 01 | 03 | A05 | S05 | 00 | *  | *  | 01 | X05 |
| 02 | 02 | *   | *   | 01 | 01 | 01 | 00 | *   |
| 03 | 02 | *   | *   | 01 | 01 | 03 | 01 | X06 |

FIG. 18B

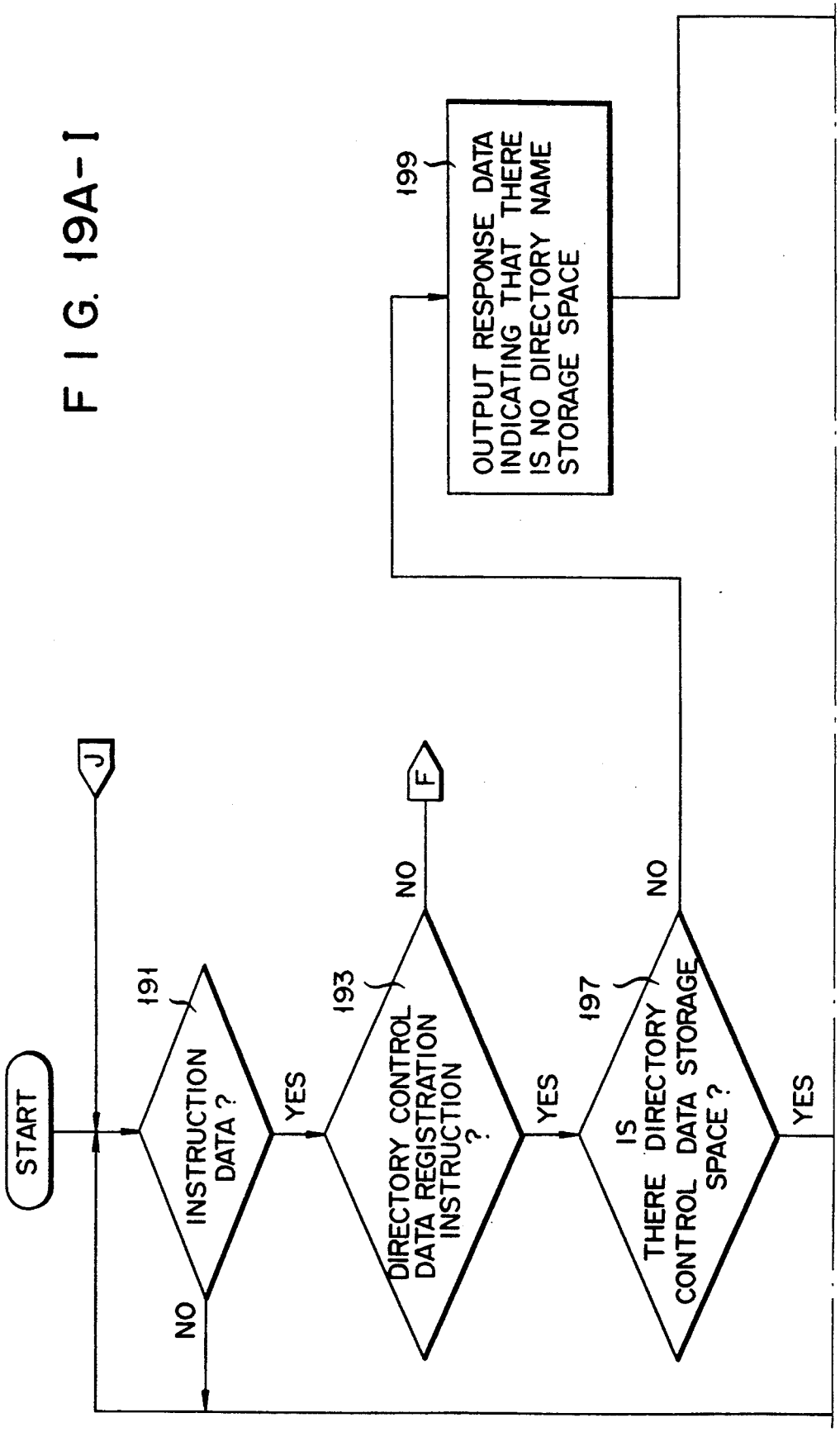

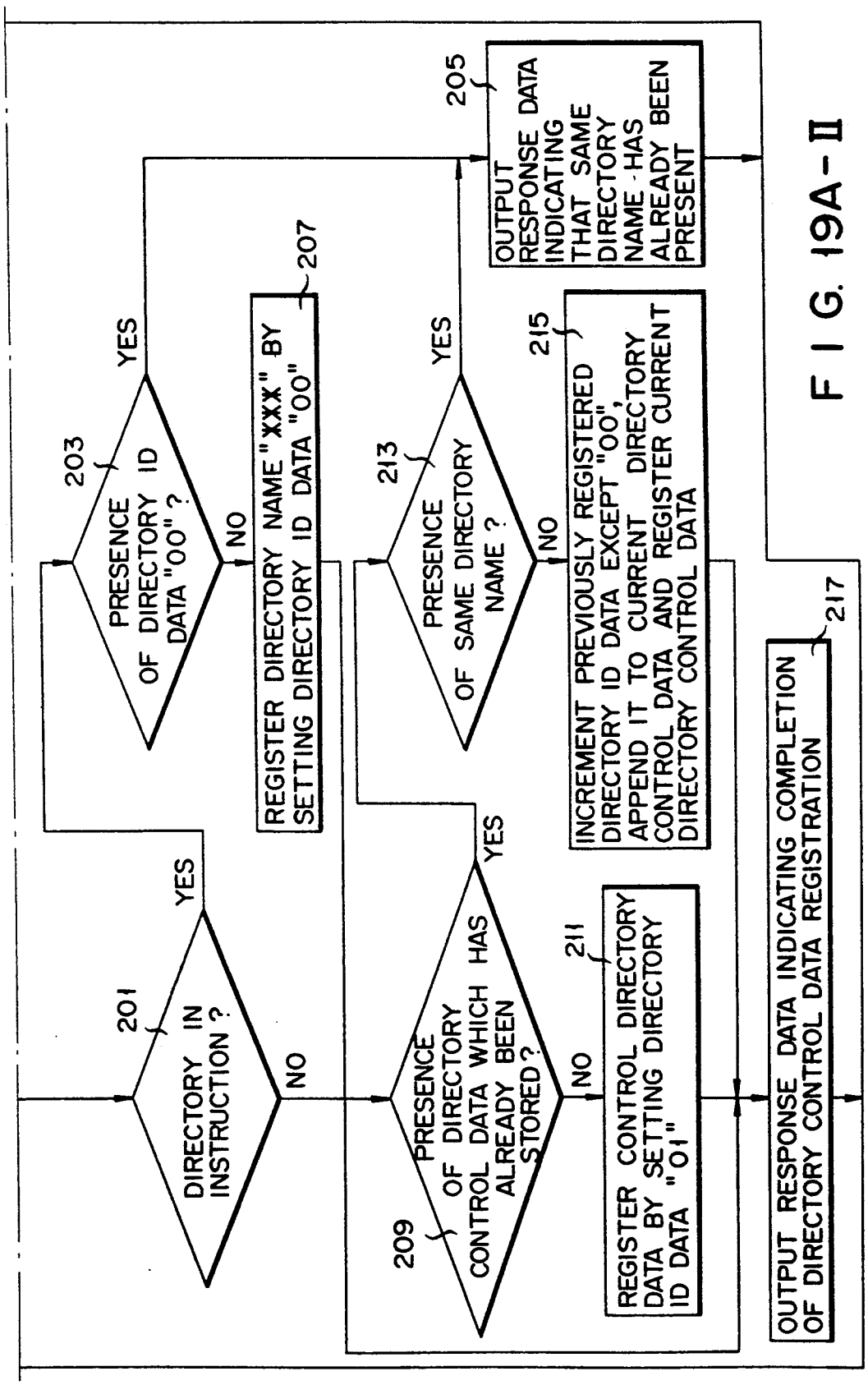
FIG. 19A-II

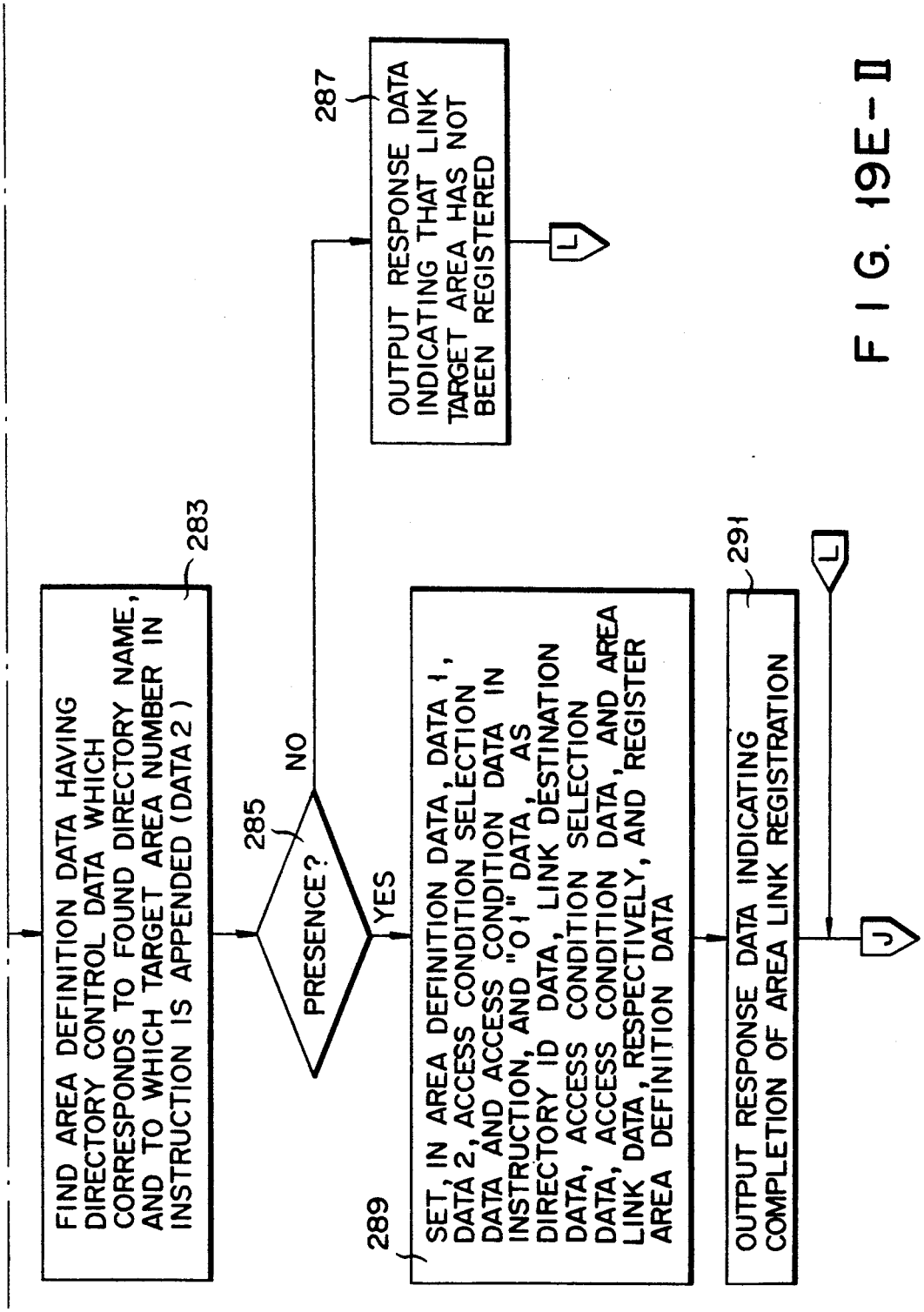

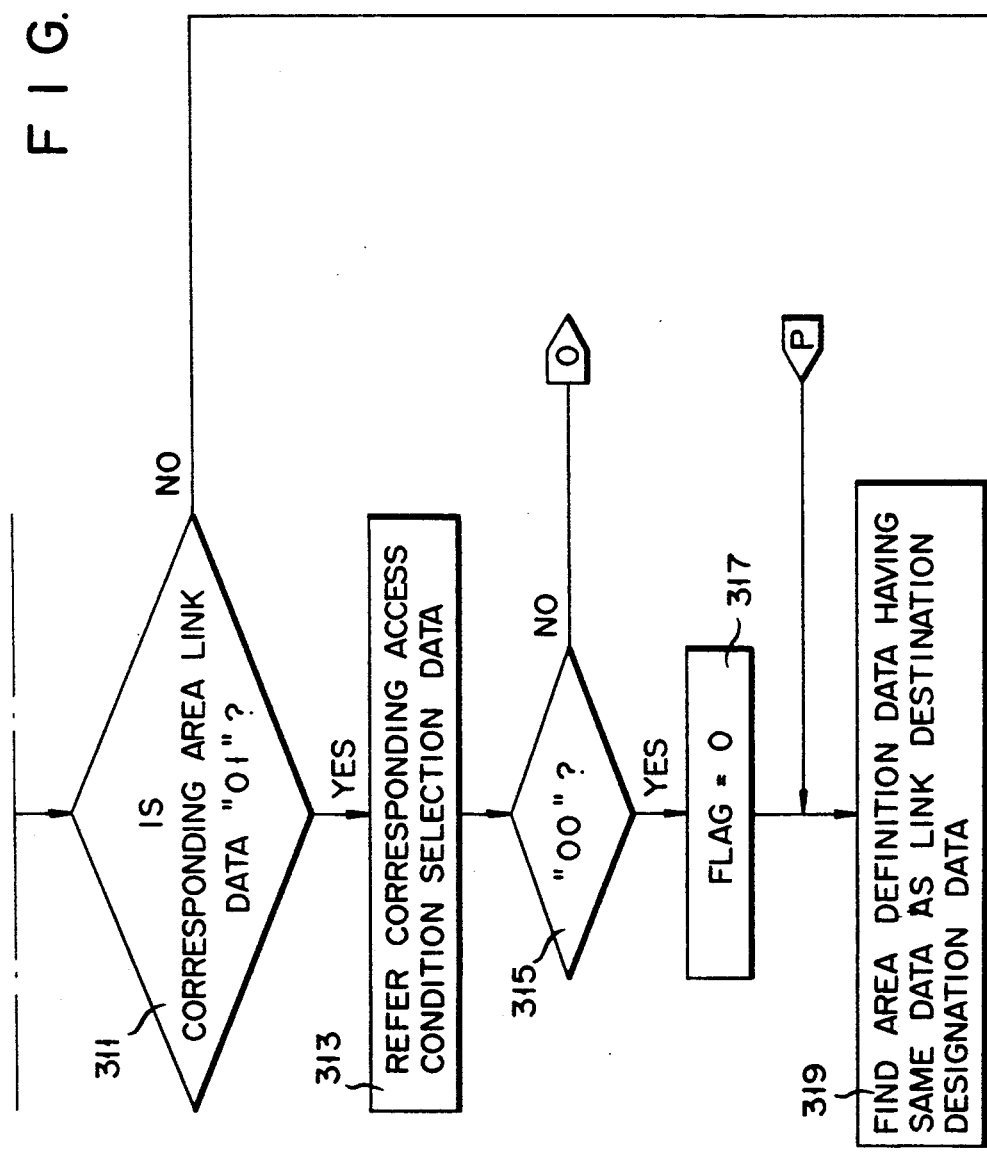

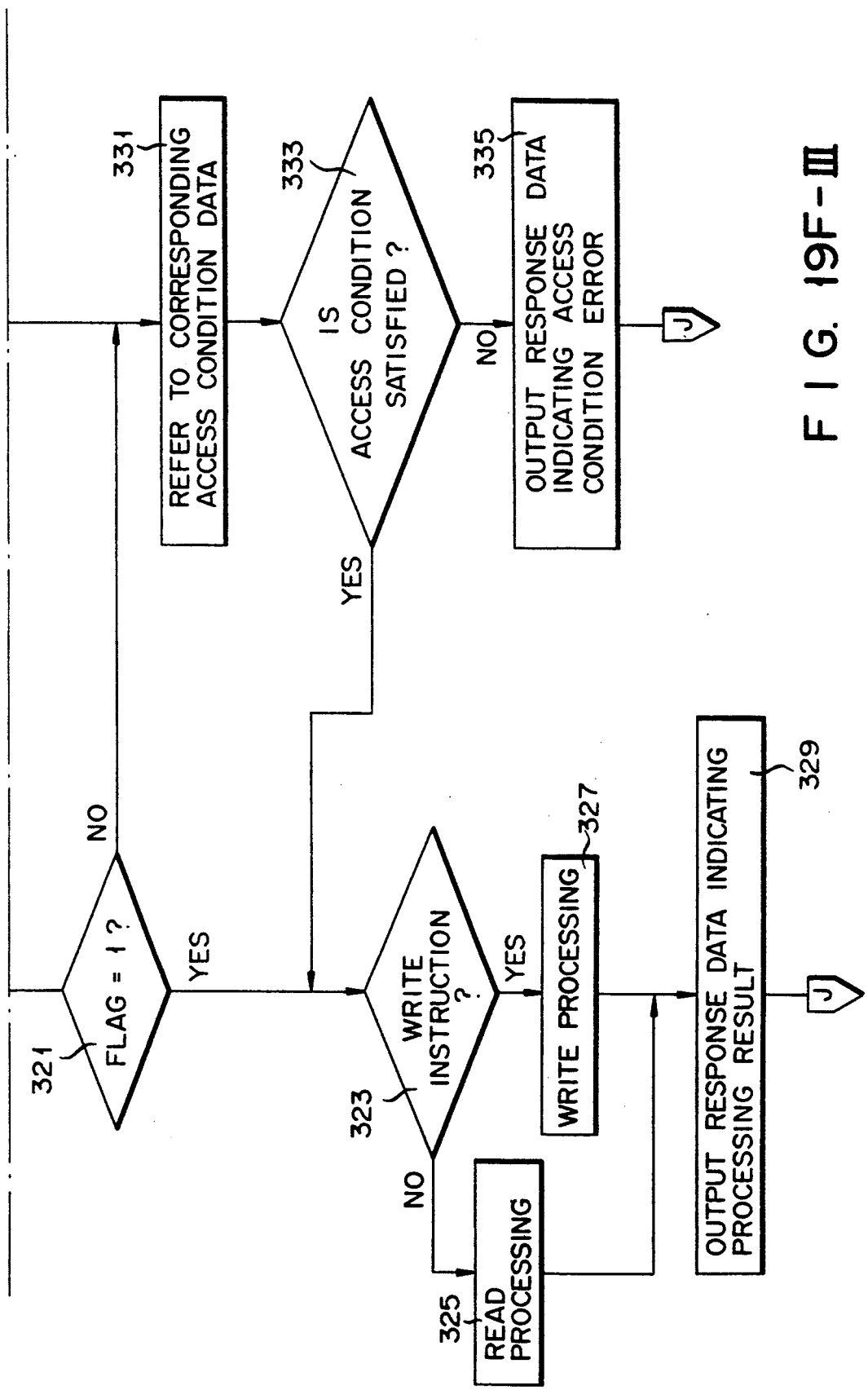
FIG. 19F-III

FIG. 20 — 195

| DIRECTORY CONTROL DATA REGISTRATION FUNCTION CODE | DIRECTORY NAME | DIRECTORY ACCESS CONDITION DATA |
|---|---|---|

FIG. 21 — 223

| AREA REGISTRATION FUNCTION CODE | AREA NUMBER | AREA SIZE | ACCESS CONDITION DATA |
|---|---|---|---|

FIG. 22 — 253

| AREA LINK REGISTRATION FUNCTION CODE | AREA NUMBER | LINK TARGET DIRECTORY NAME | LINK TARGET AREA NUMBER | ACCESS CONDITION SELECTION DATA | ACCESS CONDITION DATA |
|---|---|---|---|---|---|

PORTABLE ELECTRONIC APPARATUS FOR WRITING AND READING DATA TO AND FROM AN EXTERNAL DEVICE AND PERFORMING DATA MEMORY ALLOCATION

BACKGROUND OF THE INVENTION

1. Field of the Invention

The present invention relates to a portable electronic apparatus, called an IC card, incorporating an IC (Integrated Circuit) chip having a nonvolatile memory and a control element such as a CPU and, more particularly, to an area access method of the memory.

2. Description of the Related Art

Recently, a so-called IC card incorporating an IC chip having an erasable nonvolatile memory and a control element such as a CPU has been developed as a new portable data storage medium. A plurality of identification (ID) numbers are registered in an IC card of this type. The IC card has a means for permitting an access to its internal memory only when a collating result between an externally input ID number and a registered ID number is affirmative. Thus, the IC card is considered as a data storage medium having high secrecy.

In use, a memory is divided into a plurality of areas so as to cope with a variety of applications. Each area is logically accessed as an object to be accessed. Therefore, since a physical data storage position of the memory cannot be externally known, high secrecy can be assured. Since an access is logically made, external memory management can be facilitated.

An IC card having a memory which is divided into a plurality of areas is disclosed in U.S. Pat. No. 4,734,568, for example.

Each area of the memory has inherent ID data, called an area number. When the ID data is designated in instruction data, the IC card identifies a destination of area access, and recognizes a physical storage position to access the area.

Recently, multi-purpose IC cards have also been developed. For example, a single IC card may be utilized as a cash card for a bank, a credit card, a leisure card, an electronic memorandum card, and the like. For example, when a single IC card is utilized as a cash card for a bank and a credit card, since a holder of the cash card and the credit card is the same person, it is preferable that a holder's name, address, telephone number, and the like are commonly stored so as to effectively use a memory area. Thus, the common holder can be accessed when either the cash or credit card is used. When a given area in the IC card is used as a bankbook, the IC card must be arranged so that the given area can be accessed by a bank but cannot be accessed by a credit card company for the purpose of keeping secrecy.

When a holder's name of the cash card and a holder's name of the credit card are registered in different areas, a problem may be posed in updating processing of a holder. For example, assume that when a woman changes her surname upon marriage, she updates a holder's name of the cash card but does not update a holder's name of the credit card. This causes a problem in use of an IC card. From this point of view, a single holder's name common to the cash card and the credit card is preferably registered in a specific area of an IC card. In other words, the IC card preferably has a common data field which can be accessed regardless of applications, and an application data field in which an area corresponding to a given application can be accessed and cannot be accessed in other applications.

However, in a conventional IC card, areas physically arranged on a memory have area numbers in one-to-one correspondence. For this reason, it is impossible to access an identical area using different area numbers or to access an identical area in different applications.

SUMMARY OF THE INVENTION

It is an object of the present invention to provide a portable electronic apparatus which can access an identical area using different area numbers in different applications.

In order to achieve the above object, a portable electronic apparatus of the present invention comprises memory means which is divided into a plurality of data area groups, individual identification data being assigned to each area, and at least two different identification numbers being assigned to at least one area, and control means for selecting the area based on external input identification data. With this arrangement, an identical area can be accessed based on at least two different external input identification data.

BRIEF DESCRIPTION OF THE DRAWINGS

FIG. 1 is a block diagram showing an arrangement of a terminal apparatus handling an IC card as a portable electronic apparatus according to the present invention;

FIG. 6A is a view showing an area definition data storage area before link registration, and a storage state of area definition data, and FIG. 6B is a view showing the area definition data storage area after link registration and the storage state of the area definition data;

FIGS. 9A-I, 9A-II, 9B, 9C-I, 9C-II, 9D-I, 9D-II, 9D-III and 9E are flow charts showing an operation of an embodiment of the portable electronic apparatus of the present invention;

FIG. 10 is a view showing a format of directory name registration instruction data;

FIG. 11 is a view showing a format of directory selection instruction data;

FIG. 12 is a view showing a format of area registration instruction data;

FIG. 13 is a view showing a format of area-link registration instruction data;

FIG. 14 is a view showing a format of read instruction data from an area;

FIG. 15 is a view showing a format of write instruction data in an area;

FIG. 18A is a view showing an area definition data storage area before link registration, and a storage state of area definition data, and FIG. 18B is a view showing the area definition data storage area after link registration and the storage state of the area definition data, respectively, in the second embodiment of the present invention;

FIGS. 19A-I, 19A-II, 19B, 19C, 19D, 19E-I, 19E-II, 19F-I, 19F-II, 19F-III and 19G are flow charts showing an operation of the second embodiment of the present invention;

FIG. 20 shows a format of directory control data registration instruction data used in the second embodiment of the present invention;

FIG. 21 shows a format of area registration instruction data used in the second embodiment of the present invention; and FIG. 22 shows a format of area-link registration instruction data used in the second embodiment of the present invention.

DETAILED DESCRIPTION OF THE PREFERRED EMBODIMENTS

An embodiment of the present invention will now be described with reference to the accompanying drawings.

Figures 1, 9A:
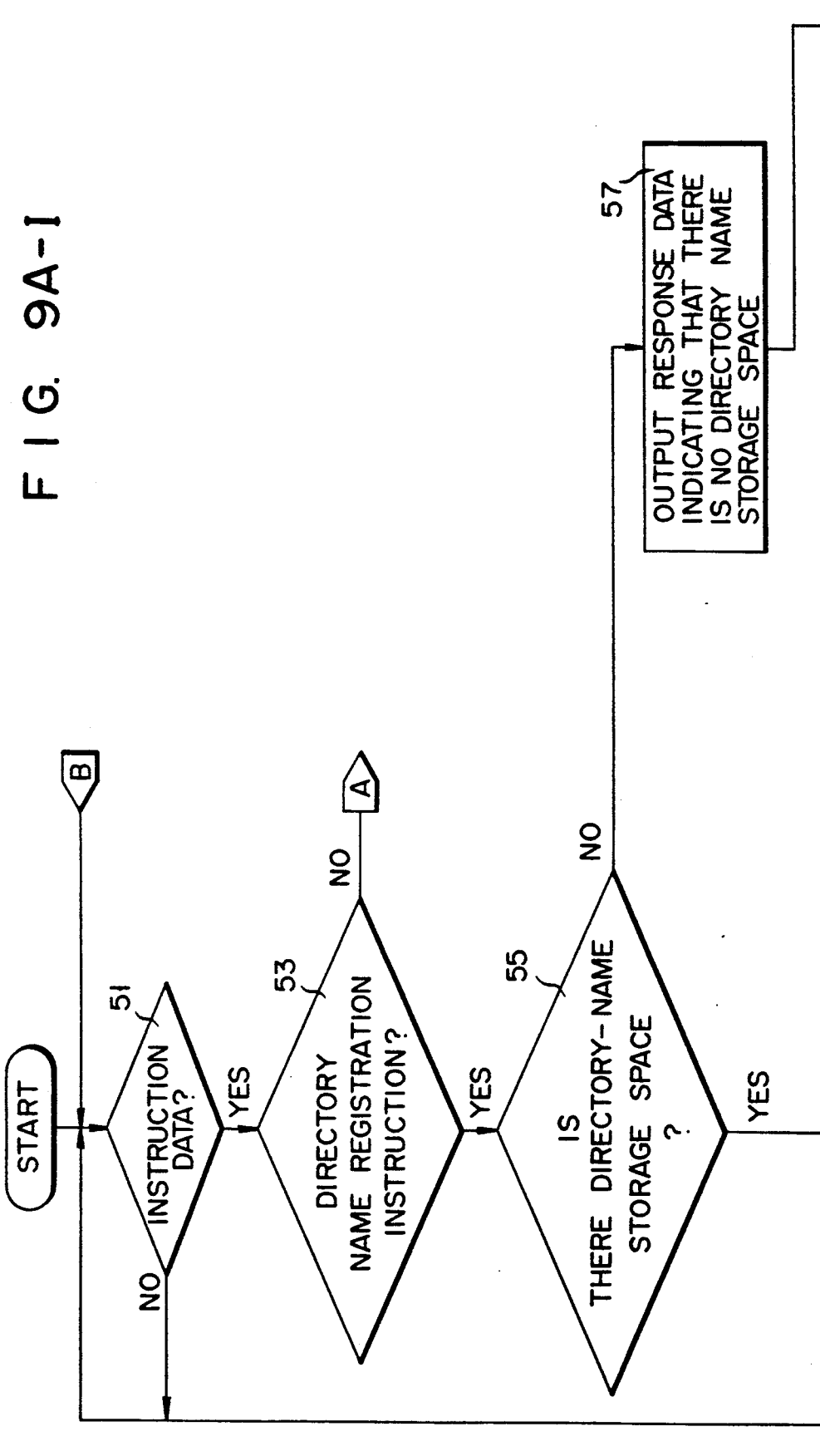

FIG. 1 shows an arrangement of a terminal apparatus handling an IC card as a portable electronic apparatus according to the present invention. More specifically, the terminal apparatus has an arrangement wherein IC card 1 can be connected to control section 3, comprising a CPU through card reader/writer 2, and control section 3 is connected to keyboard 4, CRT display 5, printer 6, and floppy disk device 7.

Figure 2:
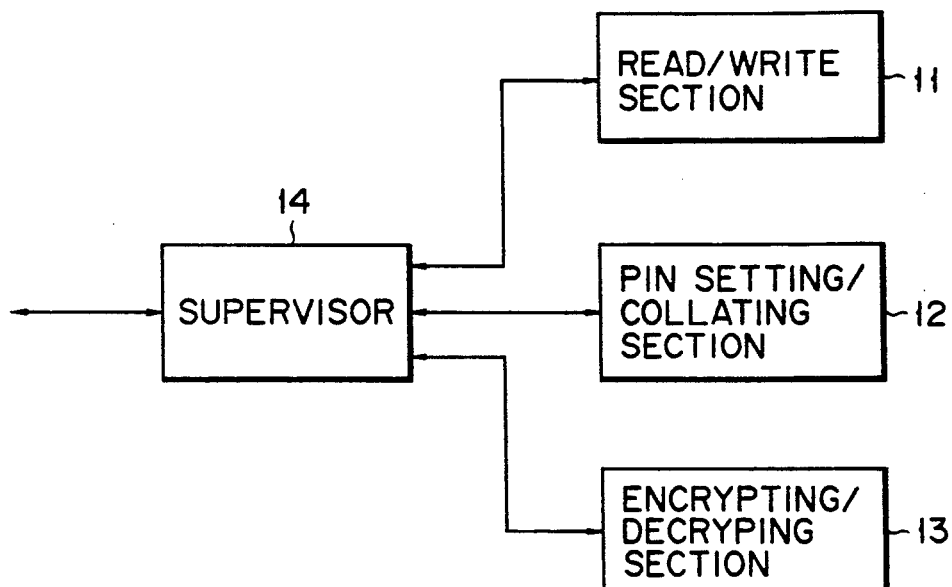
FIG. 2 is a functional block diagram of the IC card.

IC card 1 is held by a user, and performs collating of an ID number which is known by only the user, storage of necessary data, and the like upon purchasing an article at a store or the like. As shown in the functional block diagram of FIG. 2, the IC card is constituted by a portion for executing basic functions including read/write section 11, PIN setting/collating section 12, and encrypting/decrypting section 13, and supervisor 14 for managing these basic functions. Read/write section 11 is a function of reading, writing, or erasing data with respect to data memory 16. PIN setting/collating section 12 is a function of performing read/write inhibition processing a PIN (personal identification number) set by the user, and collating the PIN to permit subsequent processing after the user sets the PIN. Encrypting/decrypting section 13 is a function of encrypting data in order to prevent disclosure and counterfeit of communication data when data is transmitted from control section 3 to another terminal apparatus, and decrypting encrypted data in accordance with an algorithm such as the DES (Data Encryption Standard) having a sufficient code strength. Supervisor 14 is a function of decoding a function code input from card reader/writer 2, and selecting and executing a necessary function of the basic functions.

Figure 3:
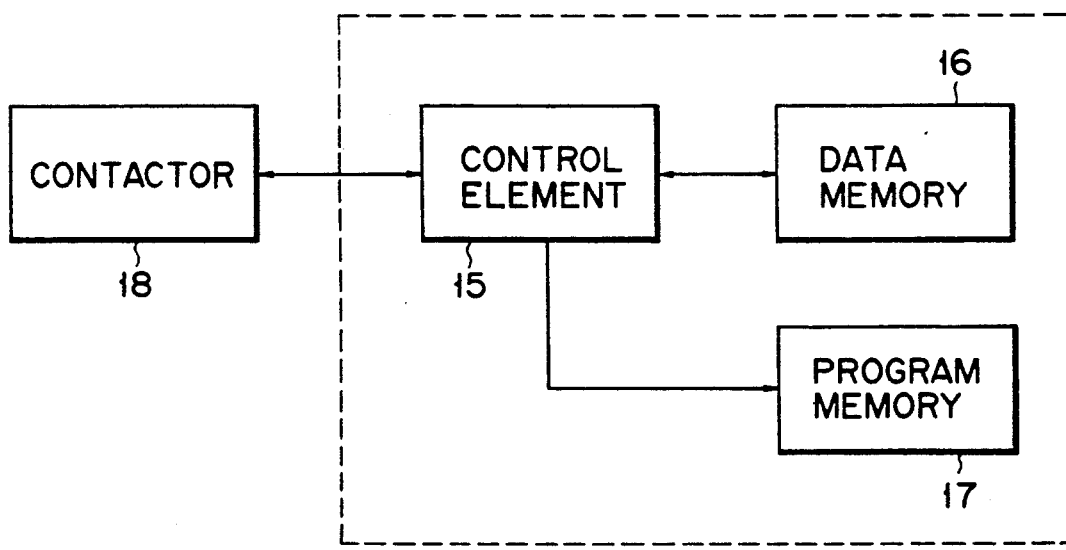
FIG. 3 is a block diagram showing a basic arrangement of the IC card of the present invention.

In order to effect these functions, IC card 1 comprises control element (control section) 15 such as a CPU, data memory (memory section) 16, program memory 17, and contactor 18 for achieving an electrical contact with card reader/writer 2, as shown in FIG. 3. Of these elements, control element 15, data memory 16, and program memory 17 are constituted by one IC chip (or a plurality of IC chips), and is embedded in an IC card main body.

Program memory 17 comprises, e.g., a mask ROM, and stores a control program for control element 15, which has subroutines for realizing the basic functions. Data memory 16 is used for storing various data, and comprises, e.g., an erasable nonvolatile memory such as an EEPROM.

Figure 4:
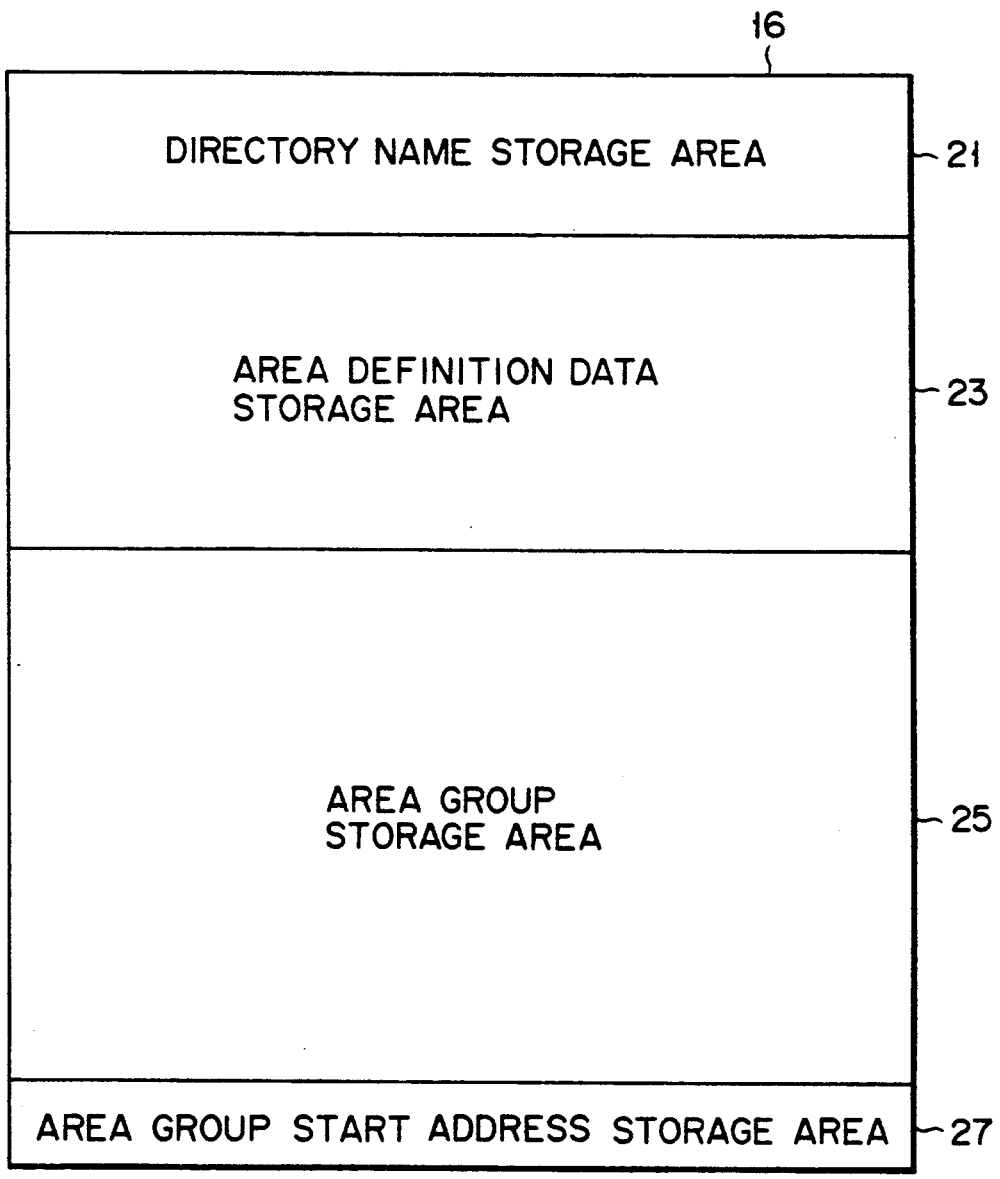
FIG. 4 is a memory map of a data memory shown in FIG. 3.

Data memory 16 is divided into a plurality of areas, as shown in FIG. 4. The areas can be roughly classified into directory name storage area 21, area definition data storage area 23, area group storage area 25, and area group start address storage area 27.

Figures 5, 7:
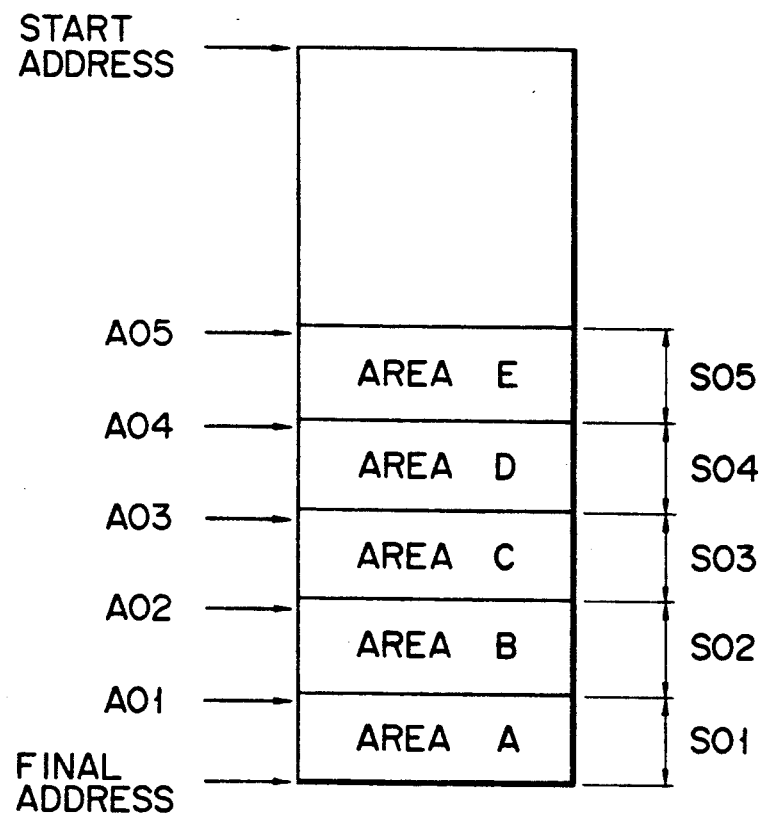
FIG. 5 is an explanatory view showing in detail directory name storage areas.
FIG. 7 is a memory map of an area group storage area shown in FIG. 4.

Directory name storage area 21 stores names of directories unique to a particular memory structure used, and consists of directory name data 29 and directory identification (ID) data 31, as shown in FIG. 5.

Area definition data storage area 23 stores area definition data 30 for defining positions of areas under the directories defined by the memory structure, and consists of directory ID data 33, area number data 35, area start address data 37, area size data 39, area link data 41, and link destination designation data 43, as shown in FIG. 6.

Directory ID data 33 indicates a directory to which an area defined by area definition data 30 belongs, and is associated with directory ID data 31 corresponding to directory name data 29 shown in FIG. 5. Note that when directory ID data 33 is "00", it can be identified that the corresponding area does not belong to any directory.

Area number data 35 indicates a number for designating an area when an area under a directory is to be accessed.

Area start address data 37 and area size data 39 indicate a physical position of an area defined by area definition data 30 in area group storage area 25 shown in FIG. 7.

Area link data 41 is used for identifying whether an area defined by area definition data 30 is area-registered or area-link registered. Note that if the area is area-registered, data 41 is given by "00", and link destination data 43 appended thereafter is made invalid. If the area is area-link registered, data 41 is given by "01", and the link destination designation data designated thereafter is made valid. In this case, previous start address data 37 and area size data 39 are made invalid.

The link destination designation data is data for indicating an area which is linked with the area defined by area definition data 30, and provides directory ID data 33 and area number data 35 of the designated link destination area.

The principle of the memory structure will be explained below with reference to FIGS. 4, 5, 6A, and 6B. Assume that three directories are defined, and their directory name data 29 are "AAA", "BBB", and "CCC", respectively, as shown in FIG. 5. As will be described later, directory name data 29 are respectively appended with "01", "02", and "03" as directory ID data 33.

In FIG. 6A, five areas are defined, and their physical positions are as shown in FIG. 7. For example, area A having area start address data "A01" and area size data "S01" is registered to have an area number "08". Since directory ID data 33 of area A is "00", this indicates that area A does not belong to any directory.

Since area C having "A03" as area start address data 37 and "S03" as area size data 39, and area E having "A05" as area start address data 37 and "S05" as area size data 39 have the same data "01" as directory ID data 33, these two areas are areas under a directory named "AAA". Note that individual area numbers are "01" for the former area, and "03" for the latter area, respectively.

Similarly, area B is an area under a directory named "BBB", and is registered to have area number "01". Area D is an area under a directory named "CCC", and is registered to have area number "01".

Area group start address storage area 27 stores data indicating areas assigned to an area group. If no areas are assigned, the data in area 27 indicates a final address value of area group storage area 25 After area A is assigned, the data is represented by a value obtained by subtracting "1" from the value "A01", and is updated every time an area is assigned.

Figure 8A:
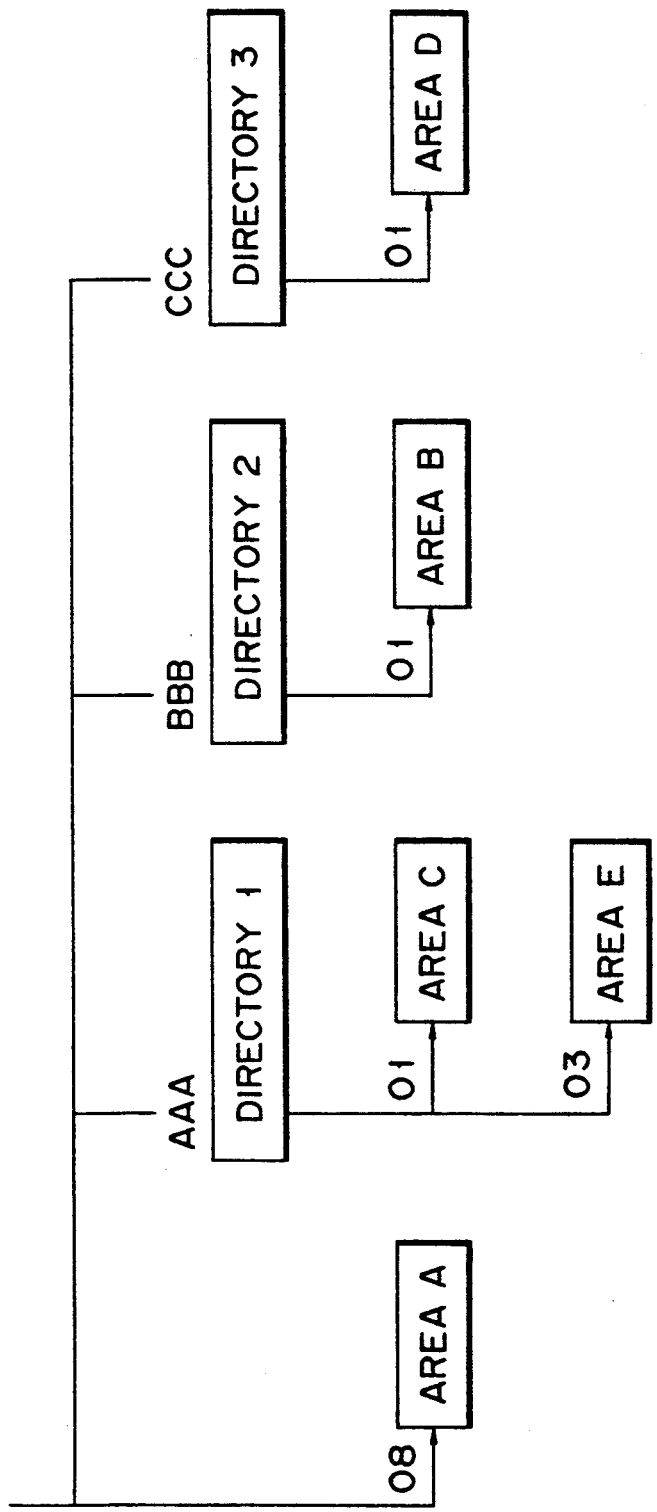
FIG. 8A is a view showing positions of areas in the area definition data storage state shown in FIG. 6A.
Figure 8B:
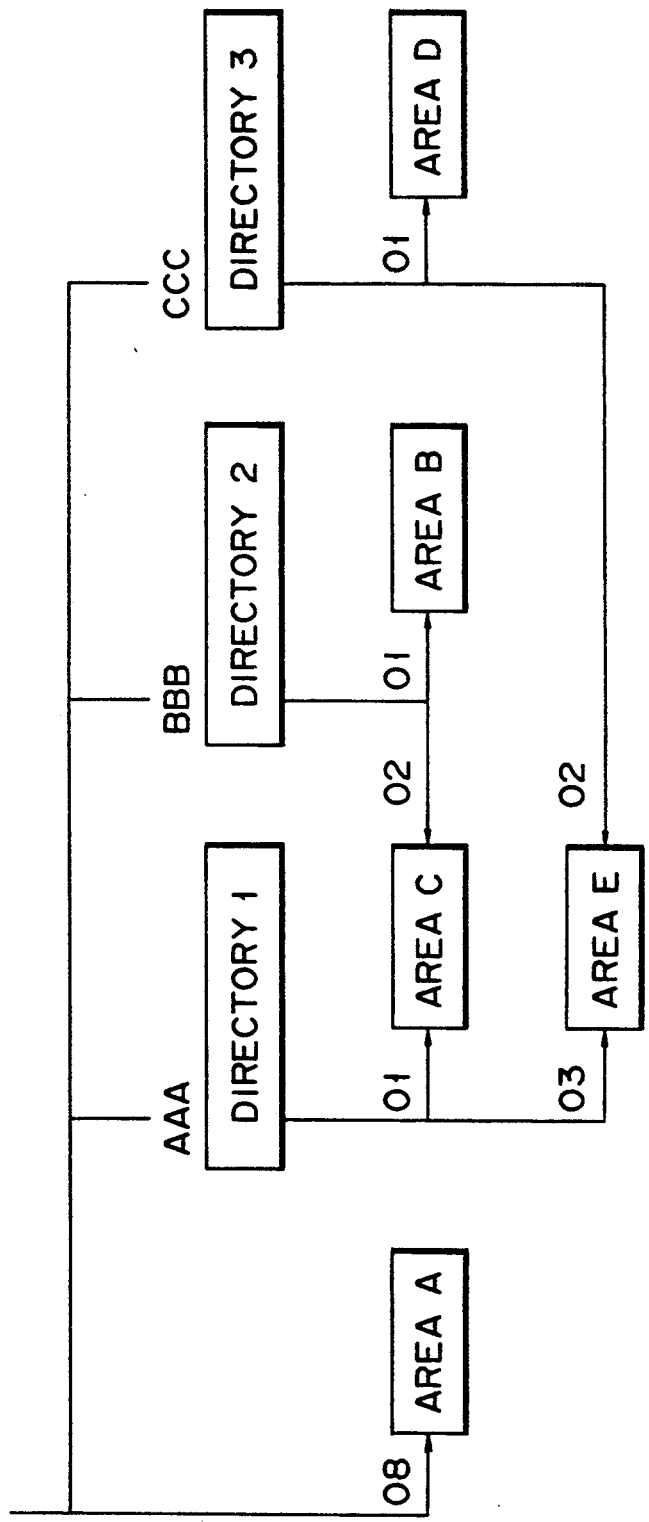
FIG. 8B is a view showing positions of areas in the area definition data storage state shown in FIG. 6B.

FIGS. 8A and 8B show the relationship between areas and directories. As shown in FIGS. 8A and 8B, areas C and E belong to directory "AAA", and are provided with area numbers "01" and "03", respectively. Area B belongs to directory "BBB", and has area number "01". Area D belongs to directory "CCC", and has area number "01". Note that area A does not belong to any directory, and has area number "08".

An operation of this embodiment with the above arrangement will be described with reference to the flow charts shown in FIGS. 9A through 9E. Registration processing of a directory name will first be described. In the flow chart shown in FIG. 9A, a steady state corresponds to an instruction standby state. If instruction data is input in step 51, control element 15 checks in step 53 if the input instruction data is directory name registration instruction data 52 shown in FIG. 10. If NO in step 53, control element 15 executes another processing.

If YES in step 53, control element 15 refers to directory name storage area 21 shown in FIG. 5 in step 55 so as to check if there is a directory name storage space in area 21. If NO in step 55, control element 15 outputs response data indicating that there is no directory name storage space in step 57, and the flow returns to step 51. If YES in step 55, control element 15 checks in step 59 if a directory name has already been stored in area 21. If NO in step 59, control element 15 registers a directory name as directory ID data "01" in step 61. After registration, control element 15 outputs response data indicating that directory name registration is completed, in step 63, and the flow returns to step 51.

If YES in step 59, control element 15 checks in step 65 if an identical directory name to that in the instruction data has already been stored. If YES in step 65, control element 15 outputs response data indicating that an identical directory name is present, in step 66, and the flow returns to step 51.

If NO in step 65, control element 15 increments, by one, data provided to a directory name, which is previously registered in area 21, appends the incremented data to a directory name in the instruction data, and registers the directory name, in step 68. After registration, control element 15 outputs response data indicating that directory name registration is completed, in step 63. In step 51, control element 15 waits for next instruction data.

FIG. 5 shows a registration result when directory names "AAA", "BBB", and "CCC" are registered by the registration processing of the directory names described above.

Directory selection processing will now be described. If it is determined that the input instruction data is not the directory name registration instruction data, control element 15 checks in step 67 if the input data is directory selection instruction data 65 shown in FIG. 11. If NO in step 67, control element 15 executes another processing.

If YES in step 67, control element 15 refers to directory name storage area 21 shown in FIG. 5 in step 69 to check if a directory name has already stored in area 21. If NO in step 69, control element 15 outputs response data indicating that no directory name is registered, in step 71, and waits for next instruction data in step 51.

If YES in step 69, control element 15 checks in step 73 if an identical directory name to that in the input instruction data has already been stored. If NO in step 73, control element 15 outputs response data indicating that a corresponding directory name has not been stored, in step 75, and waits for next instruction data in step 51.

If YES in step 73, control element 15 sets directory ID data appended to the identical directory name found in area 21 in a current buffer (not shown) allocated in the internal RAM in step 79. The content of the current buffer is set to be "00" when control element 15 is started Control element 15 outputs response data indicating that directory selection is completed, in step 81, and waits for the next instruction data in step 51.

Area registration processing will be described below.

If it is determined that the input instruction data is not the directory selection instruction data, control element 15 checks in step 83 if the input data is area registration instruction 85 shown in FIG. 12. If NO in step 83, control element 15 executes another processing.

If YES in step 83, control element 15 refers to area definition data storage area 23 shown in FIG. 6 in step 87 to check if there is an area definition data storage space in area 23. If NO in step 87, control element 15 outputs response data indicating that there is no area definition data storage space, in step 89, and waits for the next instruction data.

If YES in step 87, control element 15 checks in step 91 if area definition data having the present content of the current buffer as directory ID data and an area number in the instruction data as an area number has already been stored. If YES in step 93, control element 15 outputs response data indicating that an area has already been registered, in step 95, and waits for the next instruction data in step 51.

If NO in step 93, control element 15 computes area start address data of an area to be registered in step 97. In practice, the area start address can be obtained by subtracting area size data in the input instruction data from the storage value in area group start address storage area 25. Control element 15 then compares the area start address data as the computed value and the start address of area group storage area 23 in step 99. As a result of comparison, if the former value is not equal to or larger than the latter value, control element 15 outputs response data indicating that an area size is inadequate, in step 101, and waits for the next instruction data in step 51.

As a result of comparison in step 99, if the former value is equal to or larger than the latter value, control element 15 stores, in area definition data storage area 23, area definition data having the computed value as area start address data, area size data in the instruction data as area size data, an area number in the instruction data as an area number, and the content of the current buffer as directory ID data, in step 103. Control element 15 updates the area group start address using a value obtained by subtracting one from the computed value, in step 105, and outputs response data indicating that area registration is completed, in step 107. Control element 15 then waits for the next instruction data in step 51.

Area link registration processing will now be described.

If it is determined that the input instruction data is not the area registration instruction data, control element 15 checks in step 109 if the input data is area link registration instruction data 111 shown in FIG. 13. If NO in step 109, control element 15 executes another processing.

If YES in step 109, control element 15 refers to area definition data storage area 23 shown in FIG. 6 in step 113 to check if there is an area definition data storage space in area 23. If NO in step 113, control element 15 outputs response data indicating that there is no area definition data storage space, in step 115, and waits for the next instruction data in step 51.

If YES in step 113, control element 15 checks in steps 117 and 119 if area definition data having the present content of the current buffer as directory ID data and an area number in the instruction data as an area number has already been stored. If YES in step 119, control element 15 outputs response data indicating that an area has already been registered, in step 121, and waits for the next instruction data.

If NO in step 119, control element 15 sets, as data 1, data obtained by appending an area number to the content of the current buffer in step 117. Control element 15 checks in steps 123 and 125 if there is a target directory name to be linked in the instruction data is present. If NO in step 125, control element 15 outputs response data indicating that a target directory name to be linked has not been registered, in step 127, and waits for the next instruction data.

If YES in step 125, control element 15 checks in steps 129 and 131 if area definition data having directory ID data corresponding to the found directory name and the target area number in the instruction data has already been stored. If NO in step 131, control element 15 outputs response data indicating that the target area has not been registered, in step 133, and waits for the next instruction data in step 51.

If YES in step 131, control element 15 sets these data as data 2 in step 135. Control element 15 stores, in area definition data storage area 23, area definition data having the above-mentioned data 1 as directory ID data, the data 2 as link destination designation data, and "01" as area link data. Control element 15 outputs response data indicating that area link registration is completed, in step 137, and waits for the next instruction data.

Data write and read processing to/from area data will be described below.

If it is determined that the input instruction data is not the area link registration instruction, control element 15 checks in step 139 if the input data is read instruction data 141 shown in FIG. 14 or write instruction data 143 shown in FIG. 15. If NO in step 139, control element 15 outputs response data indicating that an instruction has not been supported, in step 145, and waits for the next instruction data.

If either instruction is detected in step 139, control element 15 checks in steps 147 and 149 if area definition data 30 having the present content of the current buffer as directory ID data and an area number in the instruction data as an area number has already been stored in area definition data storage area 23. If NO in step 149, control element 15 outputs response data indicating that an area has not been registered, in step 151, and waits for the next instruction data.

If YES in step 149, control element 15 checks in step 153 if area link data in the area definition data is "01". If YES in step 153, control element 15 finds area definition data having the same directory ID data and area number as those of the corresponding link destination designation data in step 155, and the flow returns to step 149. In step 149, control element 149 similarly checks area link data in the found area definition data. This check processing continues until the area definition data having area link data "00" is found.

If it is determined in step 153 that area definition data having area link data "00" is found, control element 15 checks in step 157 whether the instruction data is read or write instruction data. If the instruction data is the read instruction, control element 15 executes read processing in step 159. On the other hand, if it is determined in step 157 that the instruction data is the write instruction, control element 15 executes write processing in step 161. In step 163, control element 15 outputs a processing result as a response data, and waits for the next instruction data. The case of FIG. 6A exemplifies an area definition data storage state after the following processing. That is, area A (area number=08, area size data=S01) is assigned based on the area registration instruction data without performing directory selection. After a directory having directory name "BBB" is selected, area B (area number=01, area size data=S02) is assigned based on the area registration instruction data. After a directory having directory name "AAA" is selected, area C (area number 01, area size data=S03) is assigned based on the area registration instruction data. After a directory having directory name "CCC" is selected, area D (area number=01, area size data=S04) is assigned based on the area registration instruction data. Finally, after the directory having directory name "AAA" is selected, area E (area number 03, area size data=S05) is assigned based on the area registration instruction data. FIG. 8A shows the idea of FIG. 6A. FIG. 6B shows an area definition data storage state after the following processing. That is, after a directory having directory name "BBB" is selected, areas are linked based on the area link registration instruction data using area number=02, target directory name "AAA" to be linked, and target area number to be linked=01. After a directory having directory name "CCC" is selected, areas are linked based on the area link registration instruction data using area number=02, target directory name "AAA" to be linked, and target area number to be linked=03. FIG. 8B shows the idea of FIG. 6B.

Thus, when read and write instructions are executed using area number "08" before a directory is selected, read and write processing operations are executed for area A.

When read and write instructions are executed using area number "01" after directory "AAA" is selected, the read and write processing operations are executed for area C. In this case, if area number "03" is used, read and write processing operations are executed for area E.

When read and write instructions are executed using area number "01" after directory "BBB" is selected, the read and write processing operations are executed for area B. In this case, if area number "02" is used, read and write processing operations are executed for area C identical to an area when area number "01" is used after directory name "AAA" is selected.

When read and write instructions are executed using area number "01" after directory "CCC" is selected, the read and write processing operations are executed for area D. In this case, if area number "02" is used, read and write processing operations are executed for area E identical to an area when area number "03" is used after directory name "AAA" is selected.

In this state, a value obtained by subtracting one from area start address data "A05" is stored in area group start address storage area 164.

In this manner, since a function of sharing physical position data of one area by a plurality of area numbers is provided, an identical area can be accessed using different area numbers.

In this manner, with the method of sharing area definition data, even if an area number or application is varied, an access to an identical area can be performed. However, the area definition data also includes data defining an access condition for an area. If this data is also shared, an access condition inherent to individual use of an application cannot be realized. As a method of realizing this, a different access condition may be input when the area definition data is shared. However, in some situations, a user may want to use the same access condition. In consideration of this, an access condition assigned to an area as an object to be shared upon sharing of area definition data must be confirmed by any method, and the same access condition must be set.

Another embodiment of a portable electronic apparatus of the present invention will be described below, wherein in an access using different area numbers, an access to an identical area or an access to an identical area among different applications can be performed, and access conditions can be individually set.

This embodiment has a function wherein physical position data of one area is shared by a plurality of area number (ID) data, and when these area numbers are accessed, different access enable/disable conditions can be set. Therefore, in an access using different area numbers, an access to an identical area or an access to an identical area among different applications can be performed, and different access conditions can be set.

In addition, a function of sharing physical position data of one area by a plurality of areas and setting the same access enable/disable conditions for the areas is provided. Therefore, in an access using different area numbers, an access to an identical area or an access to an identical area among different applications can be performed, and the same access conditions can be set.

Moreover, a function of sharing physical position data of one area by a plurality of areas and selecting setting of different or same access enable/disable conditions is provided. Therefore, in an access using different area numbers, an access to an identical area or an access to an identical area among different applications can be performed, and different or same access conditions can be set.

The embodiment of the present invention will now be described with reference to FIGS. 16 through 22.

Figures 16, 17:
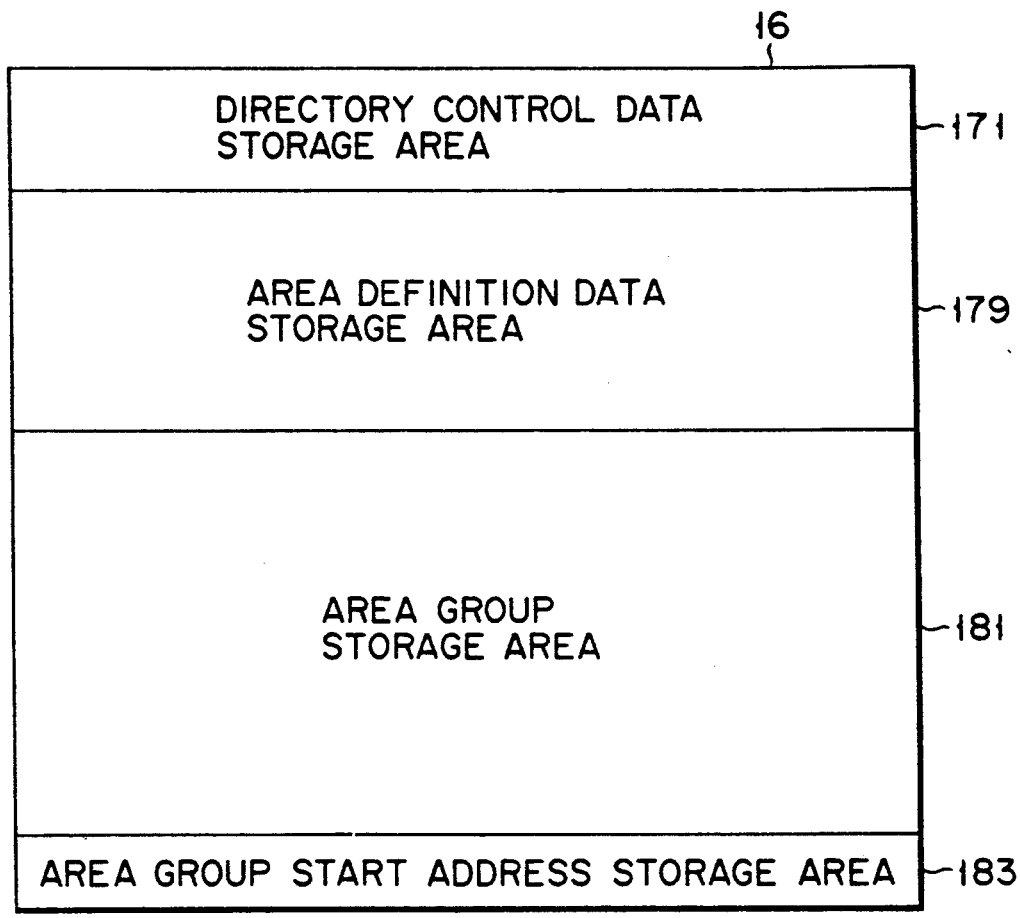
FIG. 16 is a memory map of a data memory in another embodiment of the present invention.
FIG. 17 is a view showing a directory control data storage area and a storage state of directly control data in the second embodiment of the present invention.

The same reference numerals in this embodiment denote the same parts as in the first embodiment, and a detailed description thereof will be omitted. In this embodiment, data memory 16 has directory control data storage area 171 in place of directory name storage area 161. As shown in FIG. 17, directory control data storage area 171 consists of directory name data 29, directory ID data 31, and directory access condition data 177. Directory access condition data 177 is used as determination data when area registration or area-link registration is performed. For example, a key data collating state or the like of a service offerer required when area definition data is written in area definition data storage area 179 is used.

Area definition data storage area 179 is constituted, as shown in FIGS. 18A and 18B. Area definition data consists of directory ID data 33, area number (ID data) 35, area start address data 37, area size data 39, area link data 41, link destination designation data 43, access condition selection data 185, and access condition data 187, as shown in FIG. 18A. Directory ID data 33, area number 40, area start address data 37, area size data 39, area link data 41, and link destination designation data 43 are the same as those in the first embodiment, and a detailed description thereof will be omitted.

Access condition selection data 185 takes value "00" or "01". If data 185 is "00", it is checked based on access condition data in area definition data of a link destination area if an access to the corresponding area is enabled. If data 185 is "01", it is checked based on access condition data in self area definition data if an access to the corresponding area is enabled. Note that when area definition data is area-registered, data 185 is always set to be "01". When area definition data is area-link registered, data "00" or "01" can be designated by an area-link registration instruction (to be described later).

Access condition data 187 represents an access condition for the corresponding area. For example, a key data collating state of a card holder required when the corresponding area is accessed is used.

Each directory name is appended with ID data "01", "02", or "03", and directory access condition data "Y01", "Y02", or "Y03".

In particular, directory name "***" is a directory which is forcibly selected after the IC card is started regardless of directory selection instruction 65, and is appended with directory ID data "00" and directory access condition data "Y00".

In FIG. 18A, for example, five areas are defined, and their physical positions are as shown in FIG. 7. For example, area A having "A01" as area start address data and "S01" as area size data is registered to have area number "08". Note that since area A has directory ID data "00", this indicates that area A does not belong to any directory.

Since area C having "A03" as area start address data and "S03" as area size data and area E having "A05" as area start address data and "S05" as area size data have the same directory ID data "01", this indicates that these two areas are areas under a directory named "AAA". Note that their area numbers are respectively "01" for the former area and "03" for the latter area.

Similarly, area B is registered to have area number "01" under a directory named "BBB", and area D is registered to have area number "01" under a directory named "CCC".

Note that these five area definition data are area-registered. Therefore, their access condition selection data are all "01", and individual access conditions "X01" through "X05" are appended in correspondence thereto.

In the relationship between areas and directories shown in FIGS. 8A and 8B, area A does not belong to any directory (i.e., belongs to directory name "***"), and has area number "08".

An operation of this embodiment with the above arrangement will now be described with reference to the flow charts shown in FIGS. 19A through 19G.

Registration processing of directory control data will first be described. In a steady state, control element 15 is set in an instruction data standby state. If instruction data is input in this state, control element 15 checks in step 193 if the input data is directory control instruction data 195 shown in FIG. 20. If NO in step 193, control element 15 executes another processing.

If YES in step 193, control element 15 refers to directory control data storage area 171 shown in FIG. 16 in step 197 to check if there is a directory storage space in this area. If NO in step 197, control element 15 outputs response data indicating that there is no directory control data storage space, in step 199, and waits for the next instruction data in step 191.

If YES in step 197, control element 15 checks in step 201 if a directory name in the input instruction data is present. If YES in step 201, control element 15 checks in step 203 if directory control data having directory ID data "00" has already been stored.

If YES in step 203, control element 15 outputs response data indicating that an identical directory name has already been stored, in step 205, and waits for the next instruction data. If NO in step 203, control element 15 sets directory ID data to be "00", and registers directory name "***" together with directory access condition data in the input instruction data, in step 207. After registration, control element 15 outputs response data indicating that registration of directory control data is completed, in step 217, and the flow returns to step 191 to wait for the next instruction data.

If NO in step 201, control element 15 checks in step 209 if directory control data which has already been stored and which is different from the directory control data having directory ID data "00" is present in area 171 excluding directory control data. If NO in step 209, control element 15 registers directory control data by setting directory control data to be "01" in step 211. After registration, control element 15 outputs response data indicating that registration of directory control data is completed, in step 217, and the flow returns to step 191 to wait for the next instruction data.

If YES in step 209, control element 15 checks in step 213 if directory control data having an identical directory name to that in the input instruction data has already been stored. If YES in step 213, control element 15 outputs response data indicating that an identical directory name has already been stored, in step 205, and the flow returns to step 191 to wait for the next instruction data.

If NO in step 213, control element 15 increments, by one, directory ID data of directory control data other than that having directory ID data "00", which is finally registered in area 171, appends the incremented directory ID data to the present directory control data, and registers the directory control data, in step 215. After registration, control element 15 outputs response data indicating that registration of directory control data is completed, in step 217, and the flow returns to step 191 to wait for the next instruction data.

FIG. 17 shows a result when directory names "***", "AAA", "BBB", and "CCC" are registered in this order in the directory name registration processing described above.

Figure 9B:
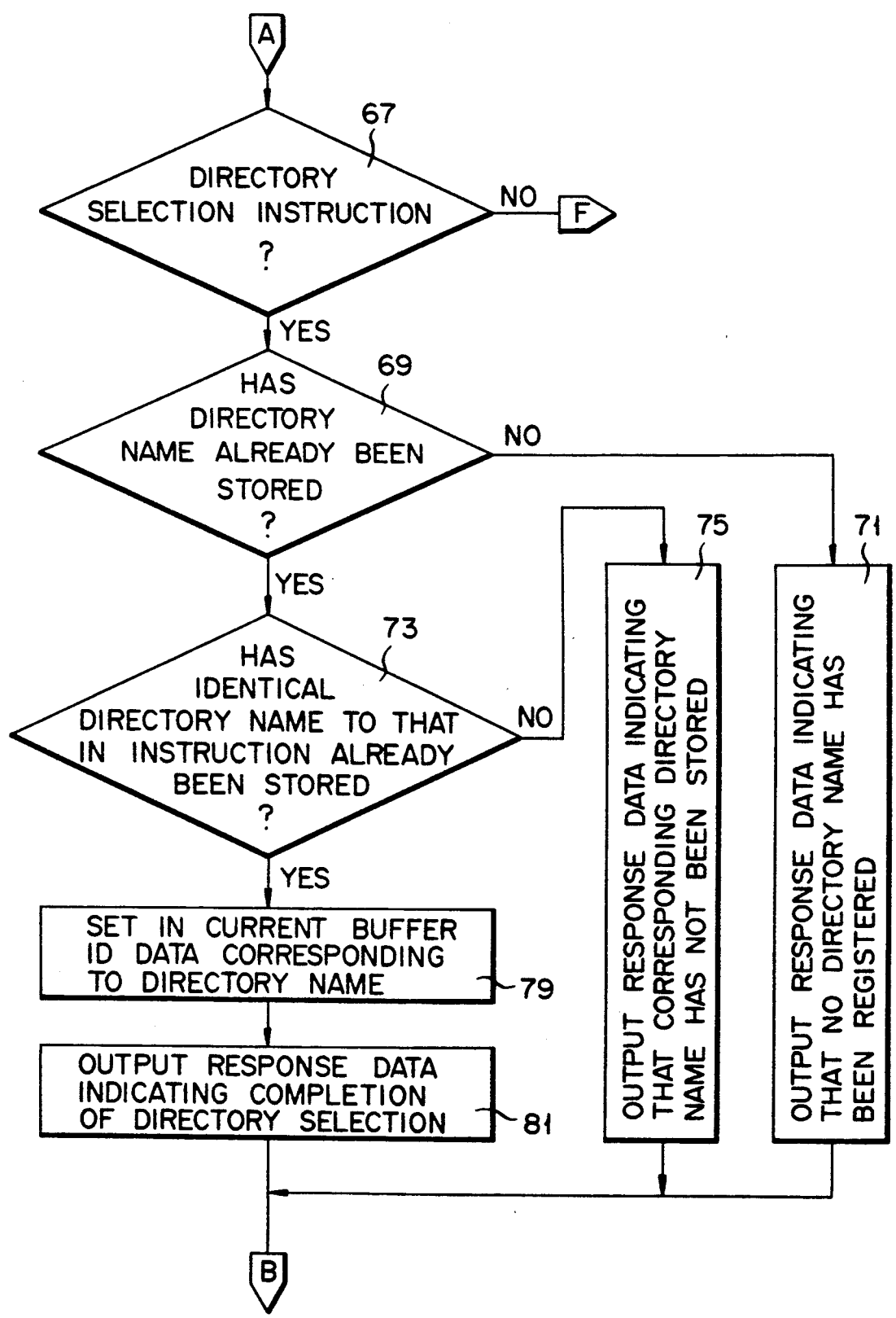
Figure 9E:
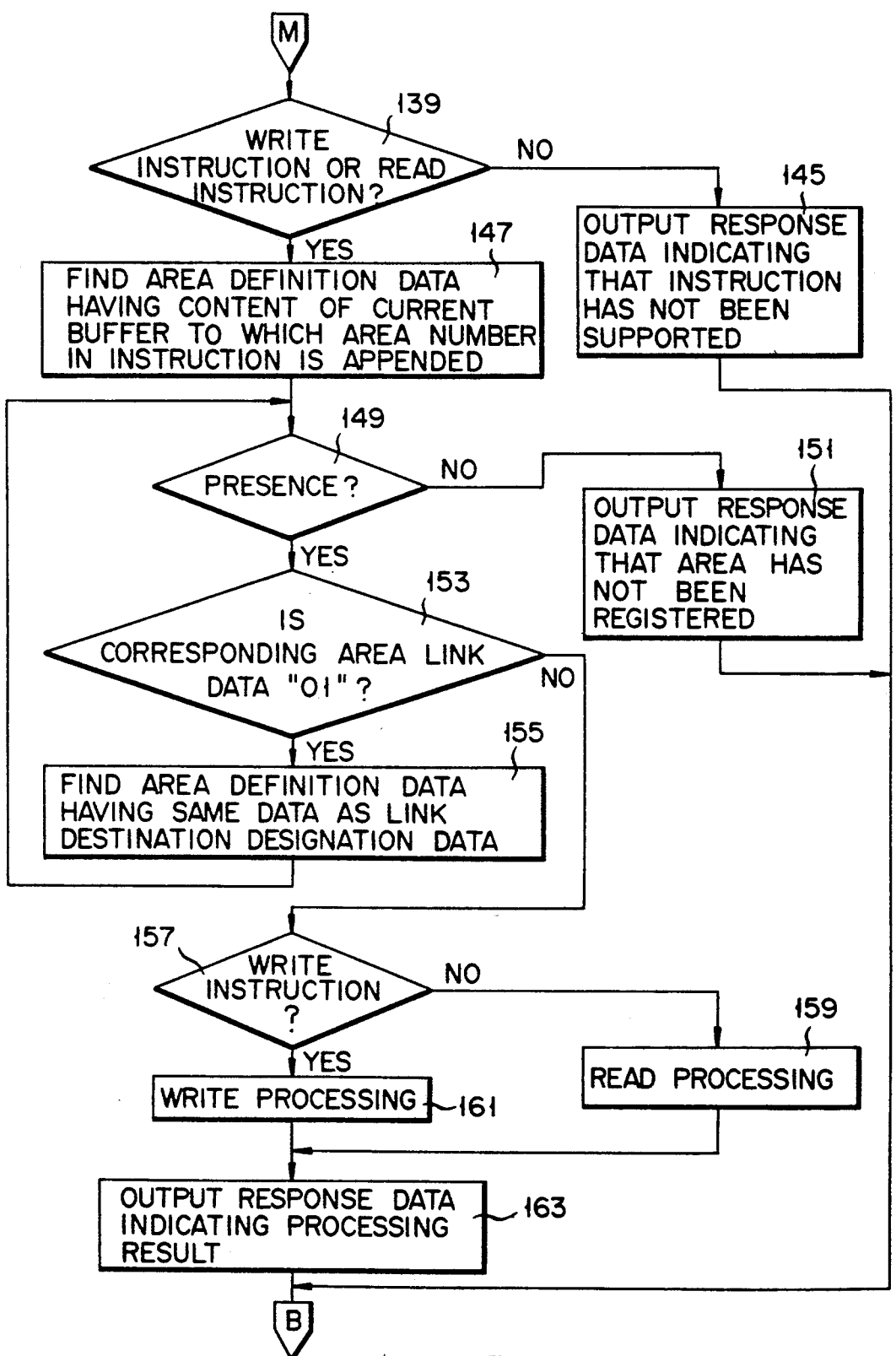

Directory selection processing is substantially the same as that shown in the flow chart of FIG. 9B, except that a directory name is replaced with directory control data in the directory selection processing shown in FIG. 9B, and a detailed description thereof will be omitted.

Area registration processing will now be described. Control element 15 checks in step 221 in FIG. 19B if the input instruction data is area registration instruction data 223 shown in FIG. 21. If NO in step 221, control element 15 executes another processing.

If YES in step 221, control element 15 refers to area definition data storage area 179 shown in FIG. 17 in step 225 to check if there is an area definition data storage space in area 179. If NO in step 225, control element 15 outputs response data indicating that there is no area definition data storage space, in step 227, and the flow returns to step 191 to wait for the next instruction data.

If YES in step 225, control element 15 refers to directory control data having the same directory ID data as the content of a current buffer in steps 229 and 231 to determine based on the corresponding access condition data whether or not the corresponding area can be accessed. If it is determined in step 231 that the access condition is not satisfied, control element 15 outputs response data indicating an access condition error in step 233, and the flow returns to step 191 to wait for the next instruction data.

If it is determined in step 231 that the access condition is satisfied, control element 15 checks in steps 235 and 237 if area definition data having the present content of the current buffer as directory ID data and an area number in the input instruction data as an area number is present. If YES in step 237, control element 15 outputs response data indicating that an area has already been registered, in step 239, and the flow returns to step 191 to wait for the next instruction data.

If NO in step 237, control element 15 computes area start address data of an area to be registered in step 241. In practice, the area start address data is obtained by subtracting area size data in the input instruction data from the storage value of area group start address storage area 183. In step 243, control element 15 compares the area start address data as the computed value with start address data of area group storage area 181. As a result of comparison, if the former value is not equal to or larger than the latter value, control element 15 outputs response data indicating that an area size is inadequate, in step 245, and the flow returns to step 191 to wait for the next instruction data. As a result of comparison, if the former value is equal to or larger than the latter value, control element 15 stores, in the area definition data storage area, area definition data having the computed value as the area start address data, area size data in the input instruction data as area size data, the area number in the input instruction data as an area number, access condition data in the input instruction data as access condition data, the content of the current buffer as directory ID data, and data link data "00", in step 247. Control element 15 updates an area group start address using a value obtained by subtracting one from the computed value, in step 249, and outputs response data indicating that area registration is completed, in step 251. Thereafter, the flow returns to step 191 to wait for the next instruction data.

Area link registration processing will be described below.

Figure 19B:
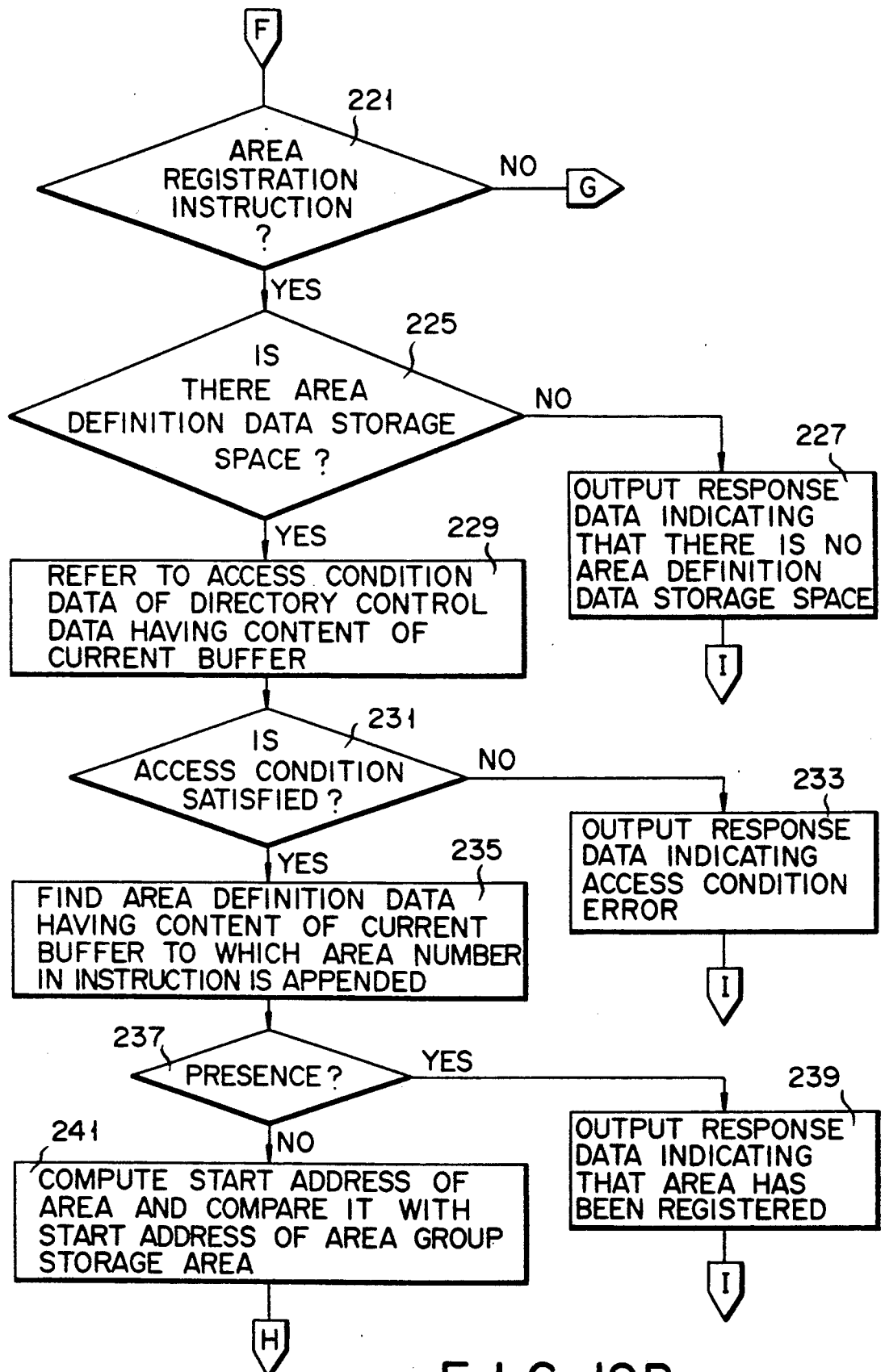
Figure 19C:
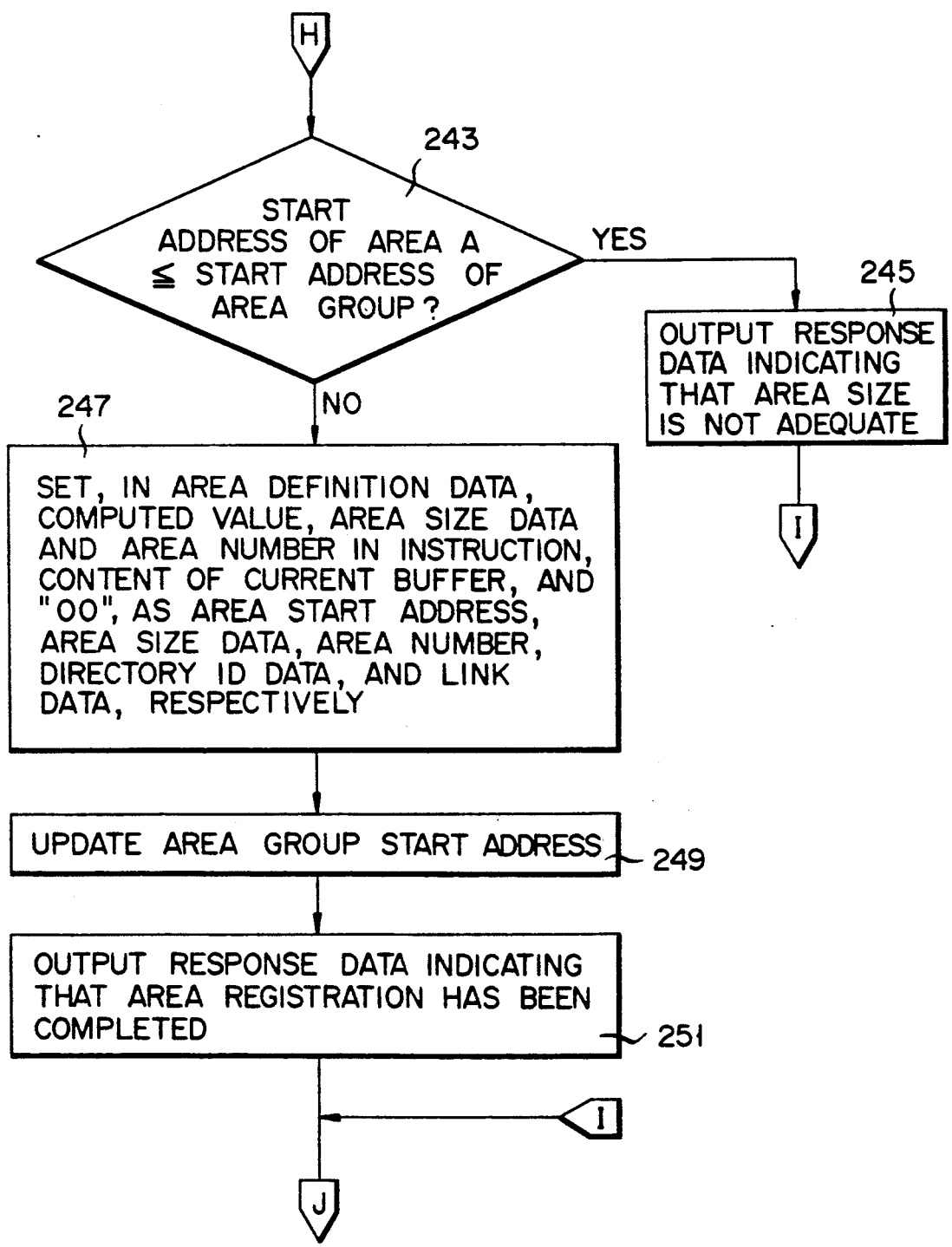
Figure 19D:
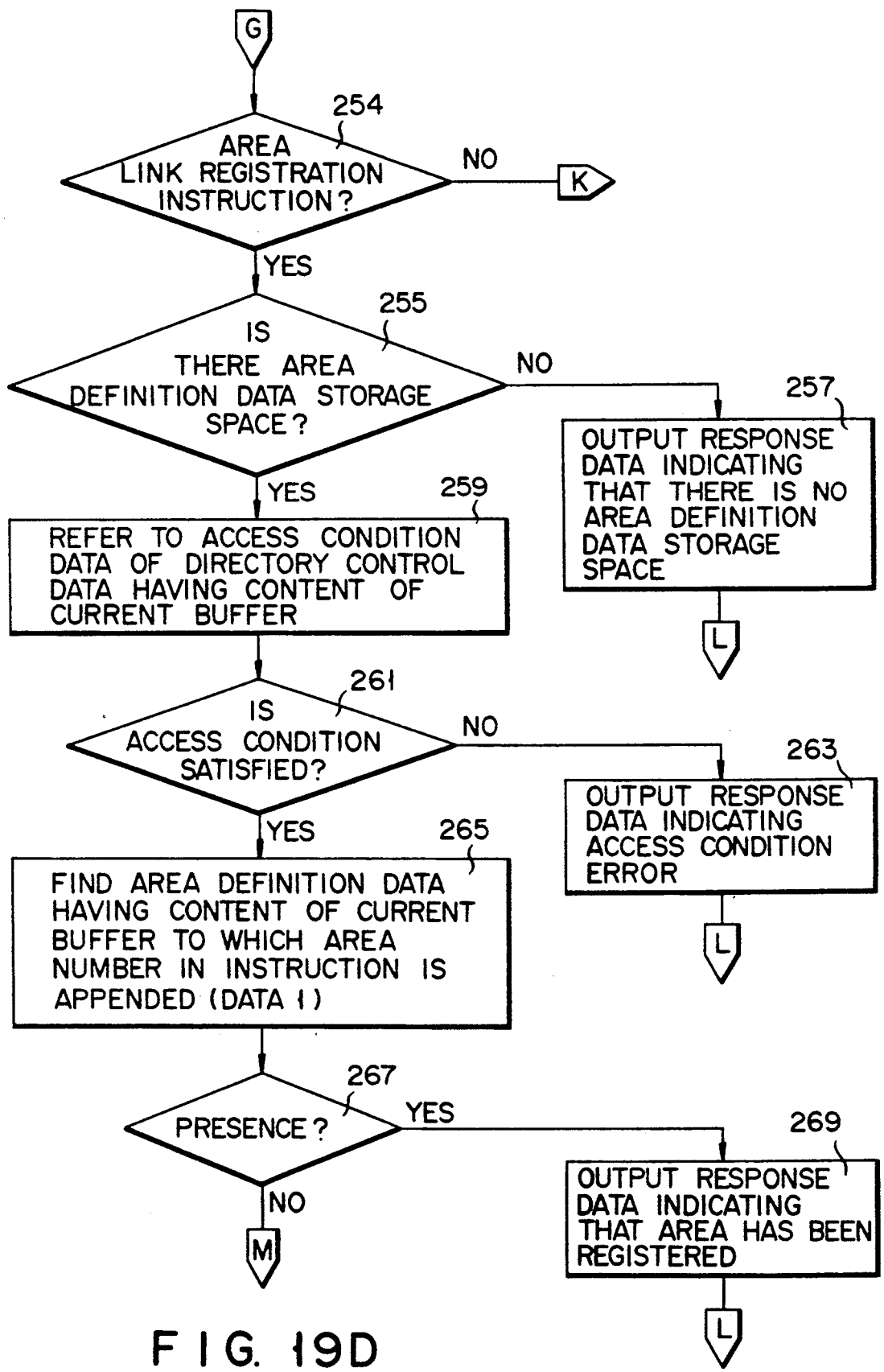
Figures 1, 19E:
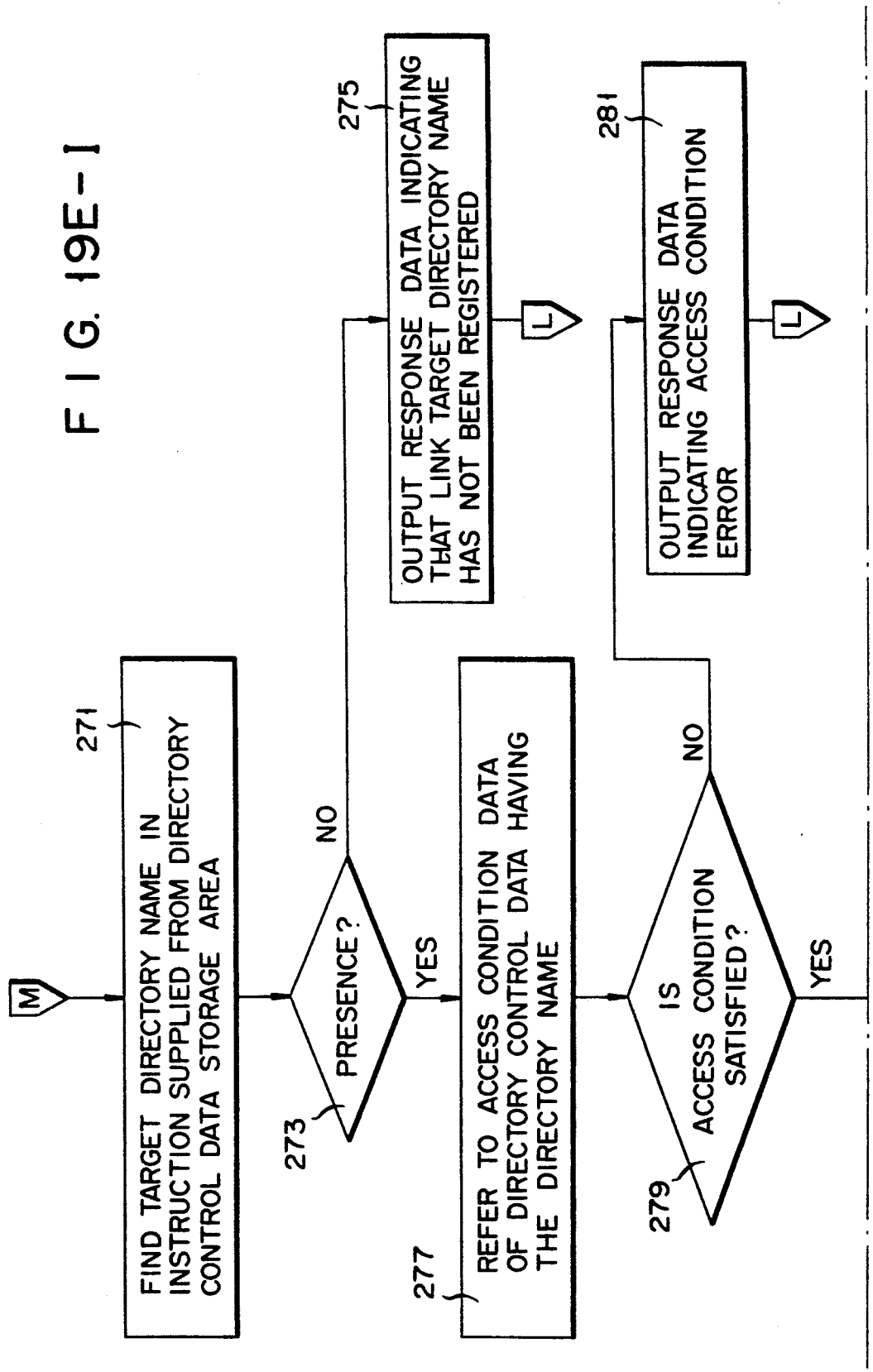
Figures 1, 19F:
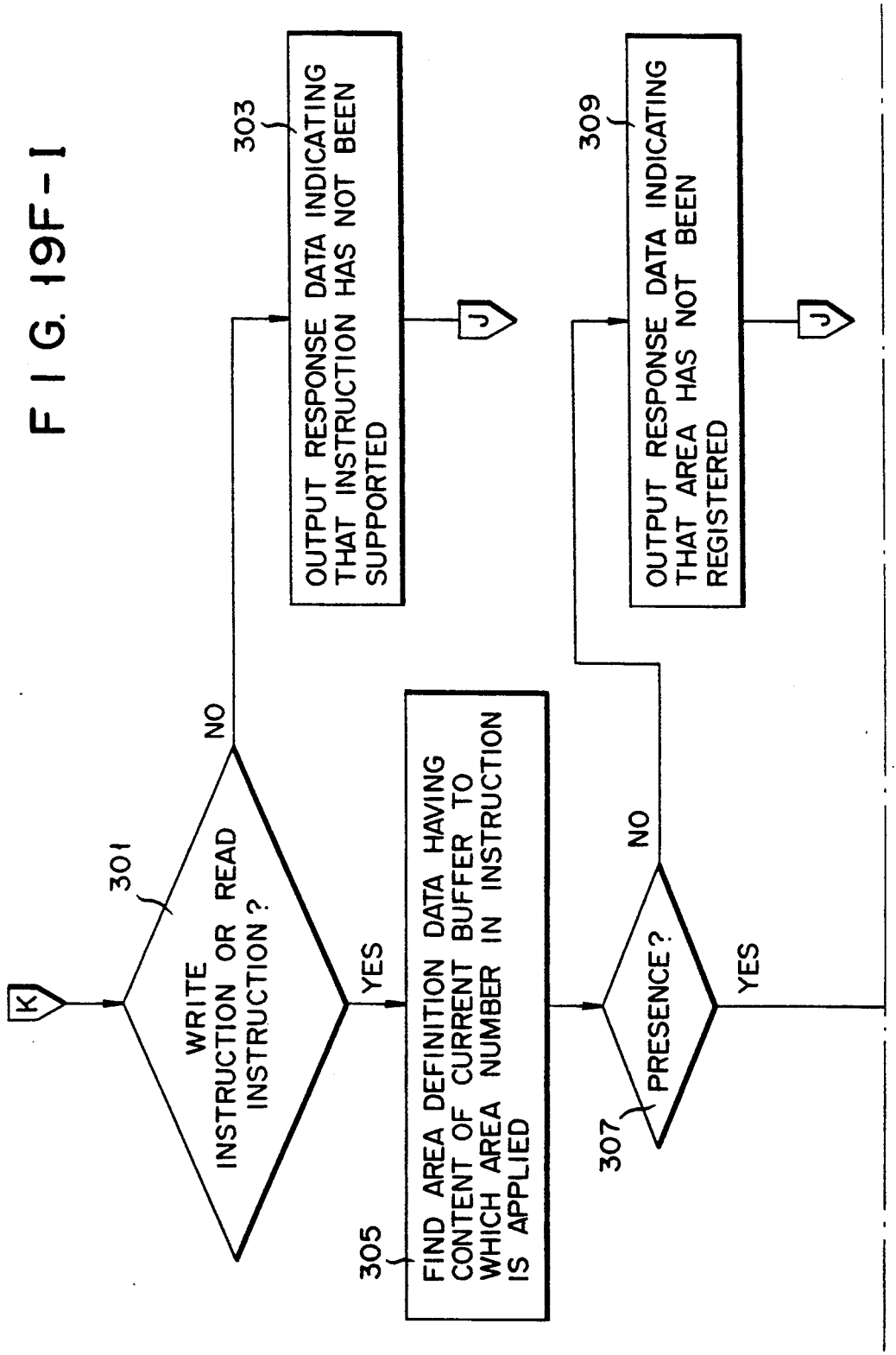
Figure 19G:
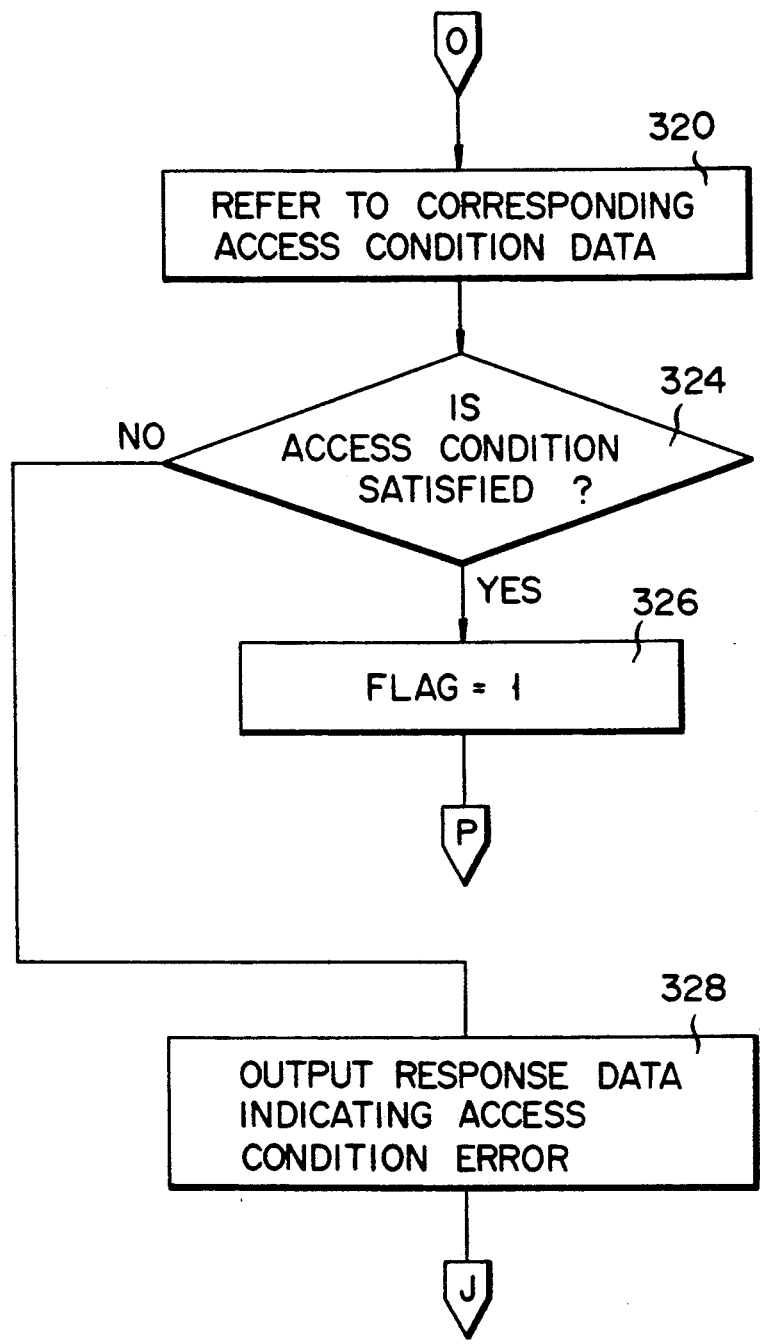

Control element 15 checks in step 254 in FIG. 19D if the input instruction data is area link registration instruction data 253 shown in FIG. 22. If NO in step 254, control element 15 executes another processing.

If YES in step 254, control element 15 refers to area definition data storage area 179 shown in FIG. 16 in step 255 to check if there is an area definition data storage space in area 179. If NO in step 255, control element 15 outputs response data indicating that there is no definition data storage space, in step 257, and the flow returns to step 191 to wait for the next instruction data.

If YES in step 255, control element 15 refers to directory control data having the same directory ID data as the content of the current buffer in step 259, and determines in step 261 based on corresponding access condition data whether or not the corresponding area can be accessed. If it is determined in step 261 that the access condition is not satisfied, control element 15 outputs response data indicating an access condition error, in step 263, and the flow returns to step 191 to wait for the next instruction data.

If it is determined in step 261 that the access condition is satisfied, control element 15 checks in steps 265 and 267 if area definition data having the present content of the current buffer as directory ID data and an area number in the input instruction data as an area number is present. If YES in step 267, control element 15 outputs response data indicating that an area has already been registered, in step 269, and the flow returns to step 191 to wait for the next instruction data.

If NO in step 267, control element 15 sets data obtained by appending the area number in the input instruction data to the content of the current buffer as data 1. Control element 15 checks in steps 271 and 273 if a target directory name to be linked in the input instruction data is present in directory control data storage area 171. If NO in step 273, control element 15 outputs response data indicating that a target directory name has not been registered, in step 275, and the flow returns to step 191 to wait for the next instruction data.

If YES in step 273, control element 15 refers to directory control data having the directory name in steps 277 and 279 to determine based on the corresponding access condition data whether or not an access can be performed. If it is determined in step 279 that the access condition is not satisfied, control element 15 outputs response data indicating an access condition error in step 281, and the flow returns to step 191 to wait for the next instruction data.

If it is determined in step 279 that the access condition is satisfied, control element 15 checks in steps 283 and 285 if area definition data having directory ID data corresponding to the found directory name and a target area number to be linked in the input instruction data has already been stored. If NO in step 285, control element 15 outputs response data indicating that a target area to be linked has not been registered, in step 287, and the flow returns to step 191 to wait for the next instruction data.

If YES in step 285, control element 15 sets directory ID data corresponding to the directory name and the target area number to be linked in the input instruction data as data 2. Control element 15 then stores, in area definition data storage area 179, area definition data having the data 1 as directory ID data, the data 2 as link destination designation data, access condition selection data in the input instruction data as access condition selection data, access condition data in the input instruction data as access condition data, and area link area "01". Control element 15 outputs response data indicating that area-link registration is completed, in step 291, and the flow returns to step 191 to wait for the next instruction data.

Read/write processing to/from an area will be described below. If it is determined in step 251 that the input instruction data is not the area link registration instruction, control element 15 checks in step 301 in FIG. 19F if the input instruction data is read instruction data shown in FIG. 14 or write instruction data shown in FIG. 15. If NO in step 301, control element 15 outputs response data indicating that an instruction has not been supported, in step 303, and the control returns to an instruction data standby state.

If it is determined in step 301 that the input instruction data is one of the read and write instructions, control element 15 checks in steps 305 and 307 if area definition data having the present content of the current buffer as directory ID data and the area number in the input instruction data as an area number has already been stored in area definition data storage area 179. If NO in step 307, control element 15 outputs response data indicating that an area has not been registered, in step 309, and the flow returns to step 191 to wait for the next instruction data.

If YES in step 307, control element 15 checks in step 311 if area link data is "01". If YES in step 311, control element 15 refers to access condition selection data in step 313, and checks in step 315 if the selection data is "00". If YES in step 315, control element 15 sets a flag provided in the internal RAM to be "0" in step 317, and finds area definition data having the same directory ID data and area number as those of the corresponding link destination designation data in step 319.

If it is determined in step 315 that the selection data is "01", control element 15 determines in steps 320 and 324 based on the corresponding access condition data whether or not an access can be performed. If it is determined in step 324 that the access condition is not satisfied, control element 15 outputs response data indicating an access condition error in step 328, and the flow returns to step 191 to wait for the next instruction data.

If it is determined in step 324 that the access condition is satisfied, control element 15 sets the flag to be "1", and similarly finds area definition data having the same directory ID data and area number as those of the corresponding link destination designation data in step 319.

If control element 15 determines in step 321 that the flag is "1", it determines in step 323 if the input instruction is a write instruction. If YES in step 323, control element 15 executes write processing in step 327; otherwise, executes read processing in step 325. In step 329, control element 15 outputs response data indicating a processing result, and the flow returns to step 191 to wait for the next instruction data.

If it is determined in step 321 that the flag is "0", control element 15 determines in steps 331 and 333 based on the corresponding access condition data whether or not an access can be performed. If it is determined in step 333 that the access condition is not satisfied, control element 15 outputs response data indicating an access condition error in step 335, and the flow returns to step 191 to wait for the next instruction data. On the other hand, if it is determined in step 333 that the access condition is satisfied, control element 15 executes processing in steps 323 through 329 described above.

If it is determined in step 311 that the area link data is "00", control element 15 advances to step 331.

In this manner, physical position data of one area is shared by a plurality of area numbers, and a function of setting different access enable/disable conditions when these area numbers are accessed, a function of setting the same access enable/disable conditions, and a function of selecting one of these functions are provided. Thus, in an access using different area numbers, an access to an identical area or an access to an identical area among different applications can be performed, and different or same access conditions can be arbitrarily set.

In the above embodiment, directory ID data and area number data of a link destination area are used as link destination designation data. However, any data may be used as long as area definition data of a link destination area can be identified. For example, position data at which area definition data of a link destination area is stored may be used.

A target directory name to be linked in link registration instruction data may be any data as long as a directory name to be linked can be internally identified.

In the above embodiment, an area for storing application data has been described, and various identification data areas necessary for accessing an IC card such as a PIN, have been described. For example, area numbers are appended to various identification data areas necessary for accessing the IC card, and collating processing for identification data having the same area number is performed using collating instruction data.

What is claimed is:

1. A portable electronic apparatus for selectively inputting and outputting data to and from an external device, said apparatus comprising:
    memory means for storing said data, said memory means comprising:
        a first group comprising at least one data area for storing a first portion of said data;
        a second group comprising at least one data area for storing a second portion of said data, said data area of said second group being different from said data area of said first group;
        a directory name storage area for storing directory characters, said directory characters being provided by said external device and identifying said first and second groups; and
        an area definition storage data area for storing area definition data, said area definition data comprising area identification characters, said area identification characters being provided by said external device and indicating to which of said groups said data areas belong; and
    control means for interacting with said external device and performing data transactions, said control means comprising:
        means for receiving, from said external device, said data and signals, said signals including said directory characters and said area identification characters, and for interpreting said signals to provide a function signal;
        means for selecting said first group and said second group to write and read said data to and from said data areas of said first group and said second group in accordance with said function signal, said selecting means being capable of accessing said data area of said first group by way of said first group and said second group and said data area of said second group by way of said first group and said second group; and
        means for encoding/decoding said data when said data is being written and read to and from said data areas of said first group and said second group.

2. An apparatus according to claim 1, wherein said area definition data further comprises area designation characters labeling said areas, area start address data indicating a position in said memory means where an area designated by the area designation character is allocated, area size data, area link data indicating whether an area is area-registered or area-link registered, and link destination designation data designating an area that is linked to one of said groups other than said group to which said area belongs.

3. An apparatus according to claim 2, wherein the directory identification data has specific data indicating that the area does not belong to any directory.

4. An apparatus according to claim 2, wherein when the area link data indicates that the area defined by the area definition data is area-registered, the link destination designation data is made invalid, and when the area link data indicates that the area defined by the area definition data is area-link registered, the area start address data and the area size data are made invalid.

5. An apparatus according to claim 1, wherein said control means further comprises:
    means for registering a directory name in the directory name storage area in accordance with a registration instruction, said registration instruction including an operation code providing a function for registering the directory name and an operand indicating the directory name.

6. An apparatus according to claim 2, said selecting means further comprising:
    directory selection instruction means for selecting a directory name stored in the directory name storage area, said directory selection instruction means including an operation code for selecting identification data corresponding to the directory means, and an operand indicating the directory name.

7. An apparatus according to claim 6, wherein said control means further comprises:
    area registration instruction means for registering an area in the area definition data storage area, said area registration instruction means providing an operation code for registering the area, and an operand indicating an area number and area size, and checking whether the directory identification data selected by said directory selection instruction means and the area designation character in said area registration instruction means has already been stored, if said area registration instruction means determines that the area definition data selected by said directory selection instruction means has not been stored, computing a start address of an area, and storing, in an area definition data storage area, area definition data including the directory identification data selected by said directory selection instruction means, the area number and area size designated by the area registration instruction means, the computed area start address, and the area link data indicating that the area being registered is not linked with another area.

8. An apparatus according to claim 2, wherein said control means further comprises means for:
    registering area link data in the area definition data storage area in accordance with an area link registration instruction provided by said function signal, said area link registration instruction including an operation code for registering the area link data, and an operand including one of said area designation characters, another one of said area designation characters to be linked with said one of said area designation characters, and a target directory name to be linked, the area designation character to be linked belonging to said target directory name, finding, from the directory name storage area, the target directory name to be linked, finding, from the area definition data storage area, area definition data having data representing the found target directory name and the target area number to be linked, setting, as area link data, data indicating that an area is linked, and storing area definition data such that directory identification data of an area to be linked as link destination designation data and an area designation character are set in the area definition data storage area.

9. An apparatus according to claim 1, wherein the area definition data includes access condition data indicating an access condition for a corresponding area, and access condition selection data indicating whether the access condition data is used.

10. An apparatus according to claim 9, wherein said control means further includes means for referencing destination designation data of the area definition data when the access condition data indicates that the access condition for the corresponding area is not used, and means for using access condition data of area definition data of a link destination area as an access condition for the corresponding area.

11. An apparatus as in claim 1, wherein said directory characters and said area identification characters are address data.

12. An apparatus as in claim 1, wherein said control means further comprises:

condition setting means, provided for each data area, for setting a condition, in accordance with said function signal, to designate access to one of said data areas by way of one of the first group and the second group, and means for determining, from the condition setting means, whether said one of said data areas is to be accessed by way of one of the first group and the second group.

* * * * *